United States Patent
Kawasaki et al.

(10) Patent No.: US 10,074,971 B2
(45) Date of Patent: Sep. 11, 2018

(54) EXCITATION INRUSH CURRENT SUPPRESSING APPARATUS AND EXCITATION INRUSH CURRENT SUPPRESSING METHOD

(71) Applicant: KABUSHIKI KAISHA TOSHIBA, Minato-ku (JP)

(72) Inventors: Kei Kawasaki, Yokohama (JP);
Tadashi Koshizuka, Saitama (JP);
Shiro Maruyama, Yokohama (JP);
Minoru Saito, Kamakura (JP);
Noriyuki Nagayama, Tokorozawa (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 694 days.

(21) Appl. No.: 14/594,702

(22) Filed: Jan. 12, 2015

(65) Prior Publication Data
US 2015/0124357 A1 May 7, 2015

Related U.S. Application Data

(63) Continuation of application No. PCT/JP2013/069635, filed on Jul. 19, 2013.

(30) Foreign Application Priority Data

Jul. 19, 2012 (JP) .................. 2012-160483

(51) Int. Cl.
*H02H 9/00* (2006.01)
*H01H 33/59* (2006.01)
(Continued)

(52) U.S. Cl.
CPC ............. *H02H 9/002* (2013.01); *H01F 27/34* (2013.01); *H01H 9/56* (2013.01); *H01H 9/563* (2013.01); *H01H 33/593* (2013.01)

(58) Field of Classification Search
CPC ...... H02H 9/002; H01H 9/563; H01H 33/593; H01H 9/56; H01F 27/34
See application file for complete search history.

(56) References Cited

U.S. PATENT DOCUMENTS

| 2011/0181989 A1* | 7/2011 | Udagawa ............... H02H 9/002 361/35 |
| 2013/0155553 A1 | 6/2013 | Kawasaki et al. |

(Continued)

FOREIGN PATENT DOCUMENTS

| EP | 2 610 885 A1 | 7/2013 |
| JP | H11-353969 A1 | 12/1999 |

(Continued)

OTHER PUBLICATIONS

U.S. Appl. No. 14/164,122, filed Jan. 24, 2014, 2014-0139959, Kawasaki et al.

(Continued)

*Primary Examiner* — Zeev V Kitov
(74) *Attorney, Agent, or Firm* — Oblon, McClelland, Maier & Neustadt, L.L.P.

(57) ABSTRACT

According to one embodiment, an excitation inrush current suppressing apparatus comprising: bus voltage measurement equipment which measures each phase voltage of the single-phase AC-side bus; transformer voltage measurement equipment which measures a single-phase-side voltage of the transformer; phase detector which detects a cutoff phase when opening the circuit breaker by monitoring each phase voltage measured by the bus voltage measurement equipment and the single-phase-side voltage measured by the transformer voltage measurement equipment, holds the detected cutoff phase, and outputs the same phase as the held cutoff phase; and close command output device which closes (Continued)

the circuit breaker by the same voltage phase as the cutoff phase output from the phase detector.

10 Claims, 21 Drawing Sheets

(51) Int. Cl.
*H01H 9/56* (2006.01)
*H01F 27/34* (2006.01)

(56) References Cited

U.S. PATENT DOCUMENTS

| | | | |
|---|---|---|---|
| 2013/0163125 A1* | 6/2013 | Udagawa | H01H 9/563 361/35 |
| 2014/0139959 A1 | 5/2014 | Kawasaki et al. | |

FOREIGN PATENT DOCUMENTS

| | | |
|---|---|---|
| JP | 2008-140580 A1 | 6/2008 |
| JP | 2008-160100 A1 | 7/2008 |
| JP | 2010-073666 A1 | 4/2010 |
| JP | 2011-154974 A1 | 8/2011 |
| JP | 2012-043711 A1 | 3/2012 |
| JP | 2012-43712 A | 3/2012 |
| JP | 2012-043744 A1 | 3/2012 |
| JP | 2013-037767 A1 | 2/2013 |
| WO | WO 2012/026423 A1 | 3/2012 |

OTHER PUBLICATIONS

U.S. Appl. No. 13/769,066, filed Feb. 15, 2013, 2013-0155553, Kawasaki et al.
U.S. Appl. No. 13/773,372, filed Feb. 21, 2013, 2013-0163125, Udagawa et al.
Japanese Office Action dated Nov. 29, 2016 in Patent Application No. 2012-160483 (with English translation).
International Search Report dated Sep. 17, 2013 for PCT/JP2013/069635 filed on Jul. 19, 2013 with English Translation.
Written Opinion dated Sep. 17, 2013 for PCT/JP2013/069635 filed on Jul. 19, 2013.
Extended European Search Report dated Feb. 8, 2016 in Patent Application 13819958.3.
Office Action dated Aug. 2, 2016 in Japanese Patent Application No. 2012-160483 (with English translation).
Office Action dated Jun. 11, 2015 in Australian Patent Application No. 2013291046.

* cited by examiner

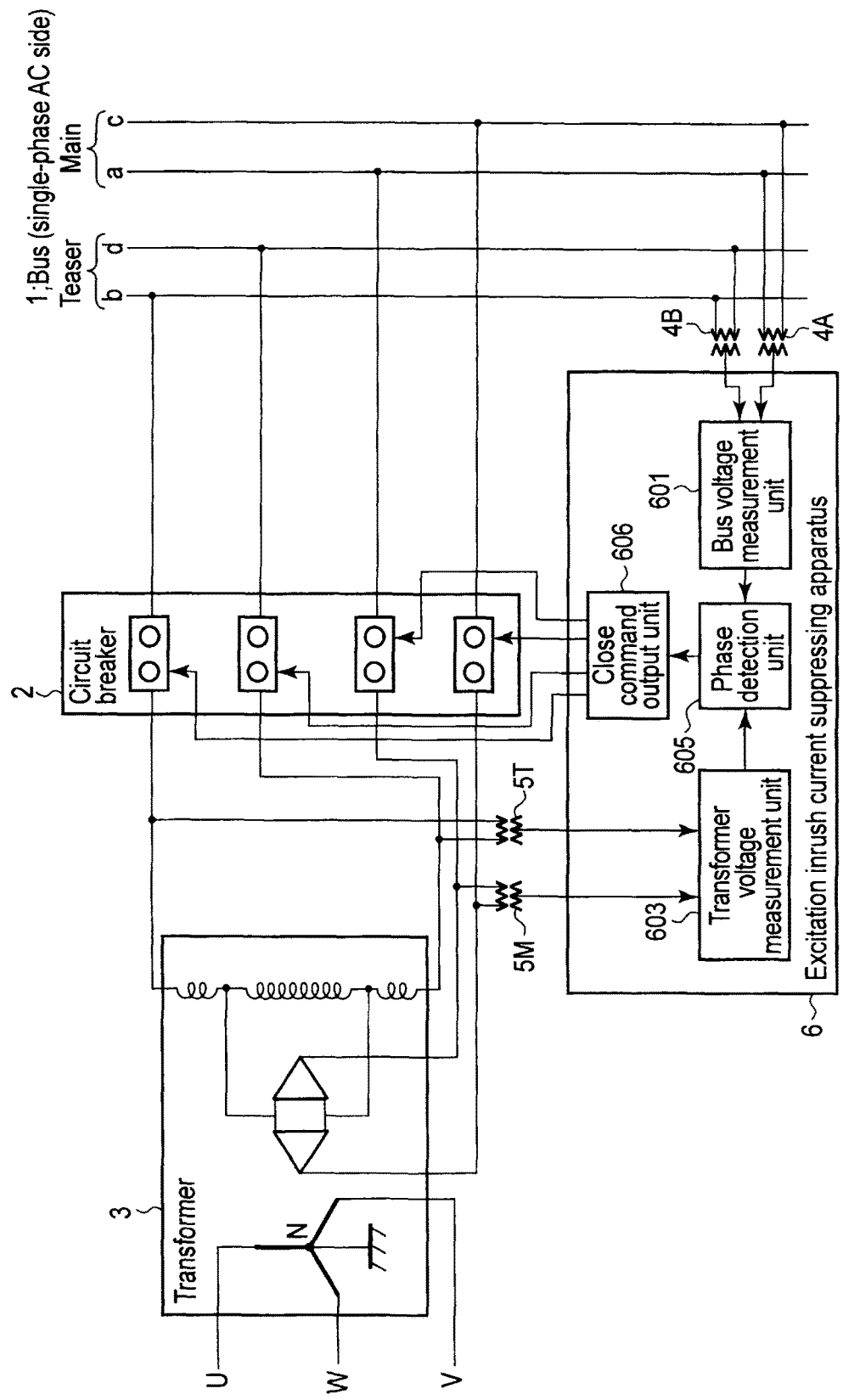
F I G. 1

Woodbridge connection

Modified woodbridge connection

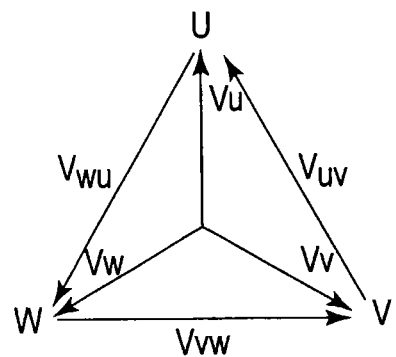
Three-phase side
F I G. 5B
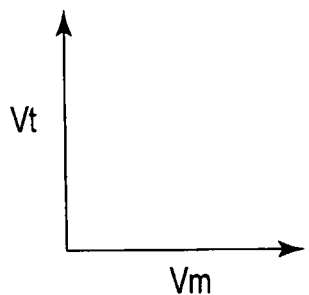
Single-phase side
F I G. 5C

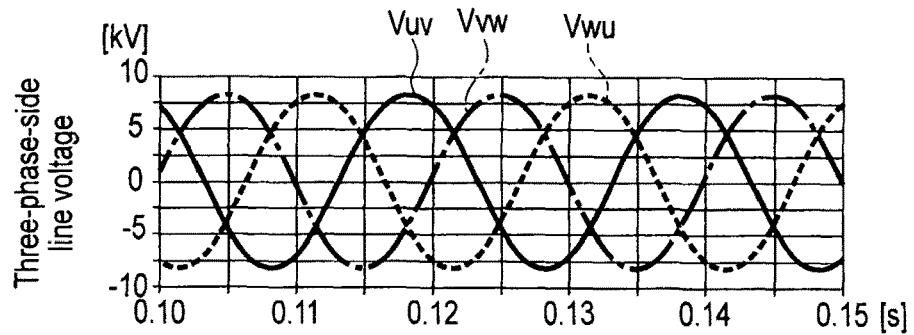
F I G. 6A
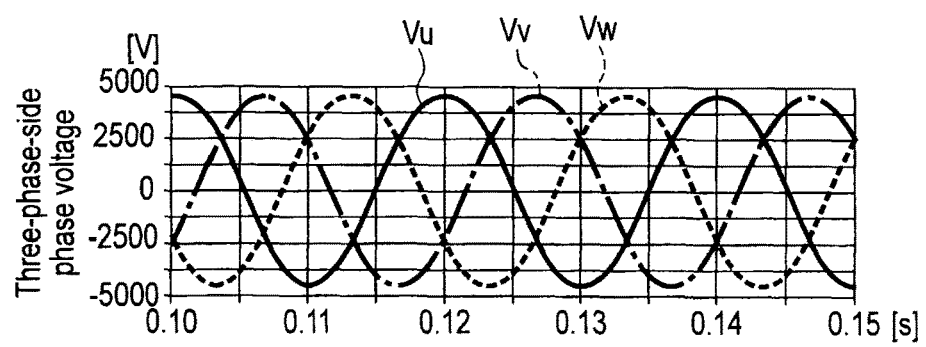
F I G. 6B
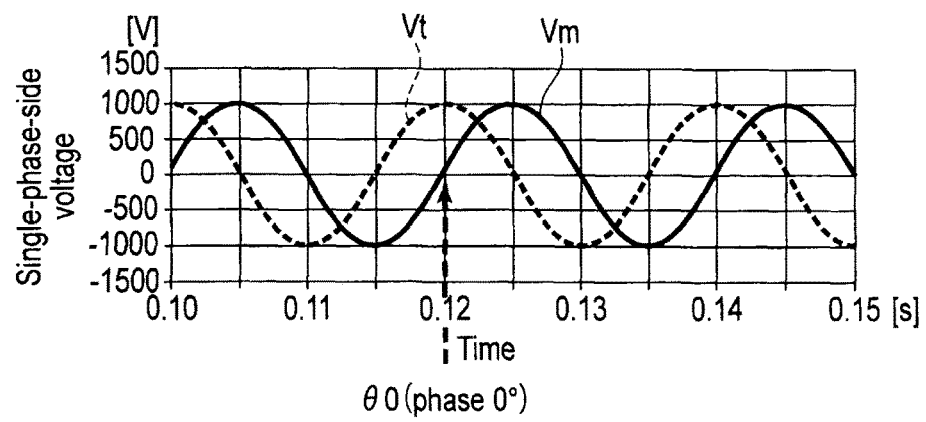
F I G. 6C

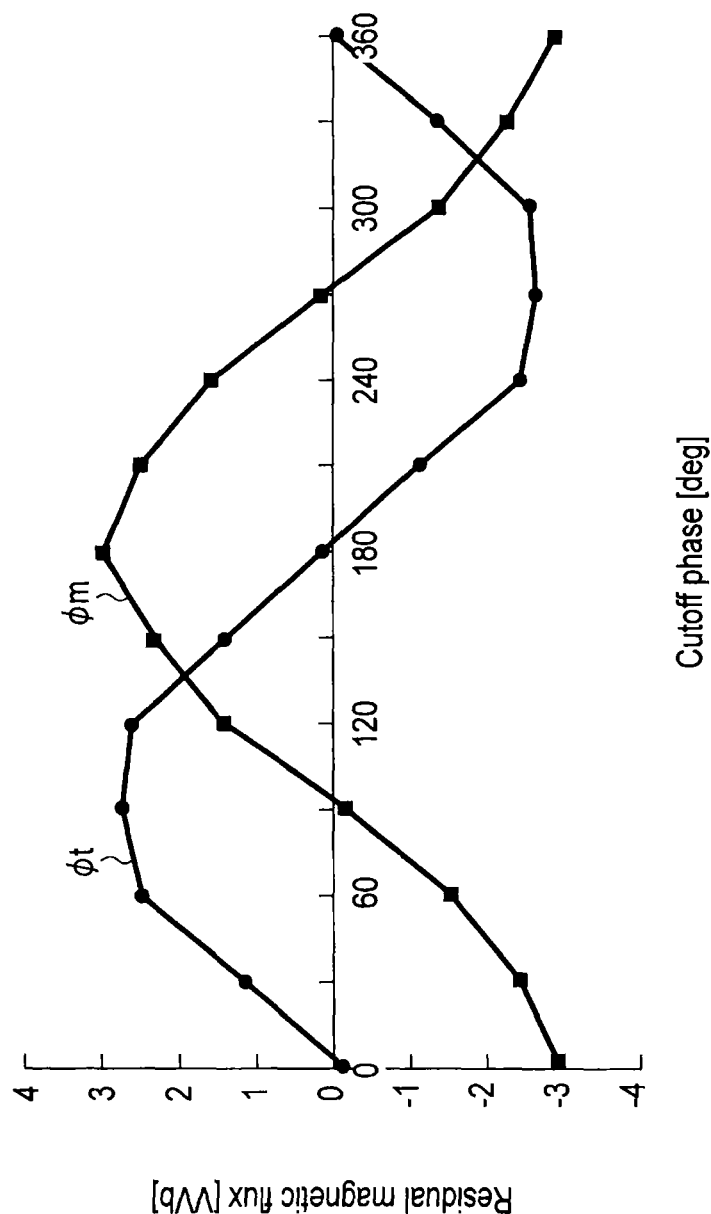
F I G. 7

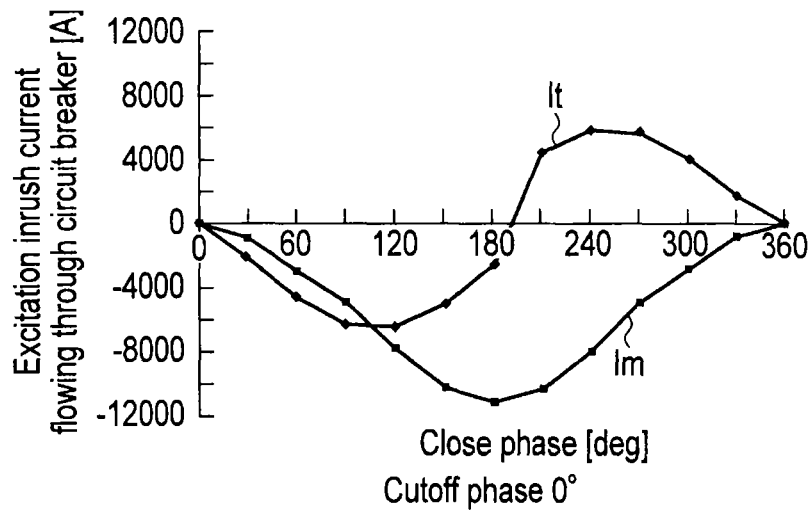
F I G. 8A
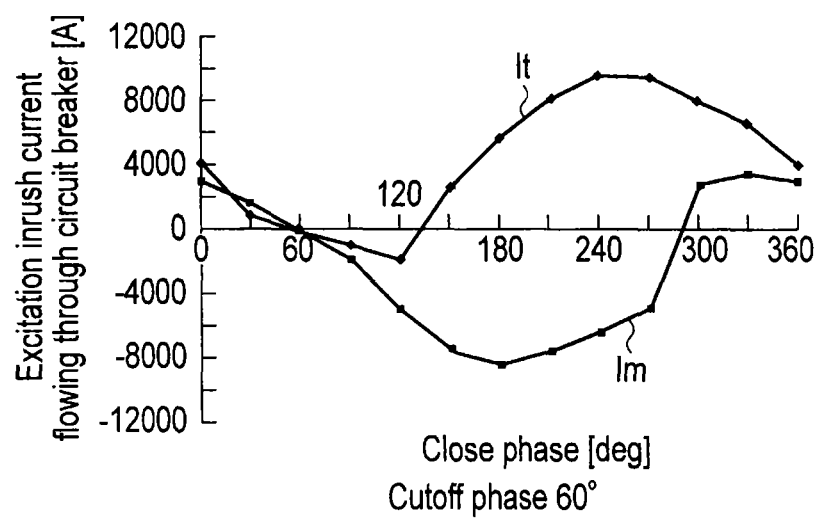
F I G. 8B

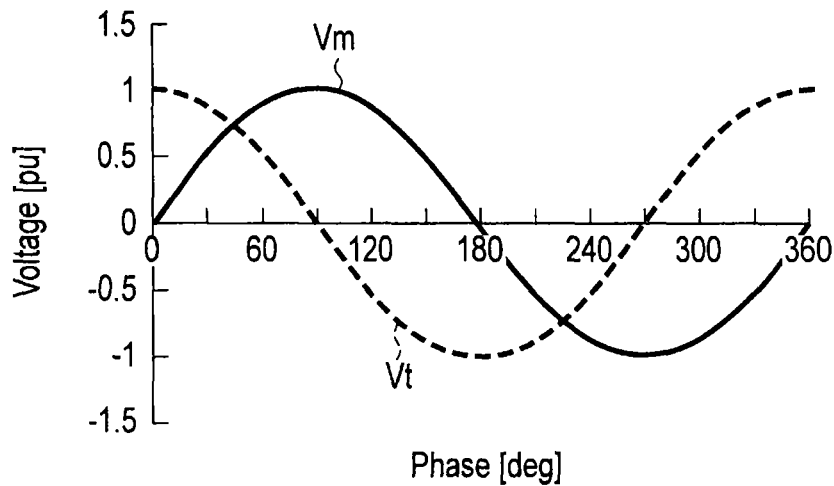
F I G. 10A
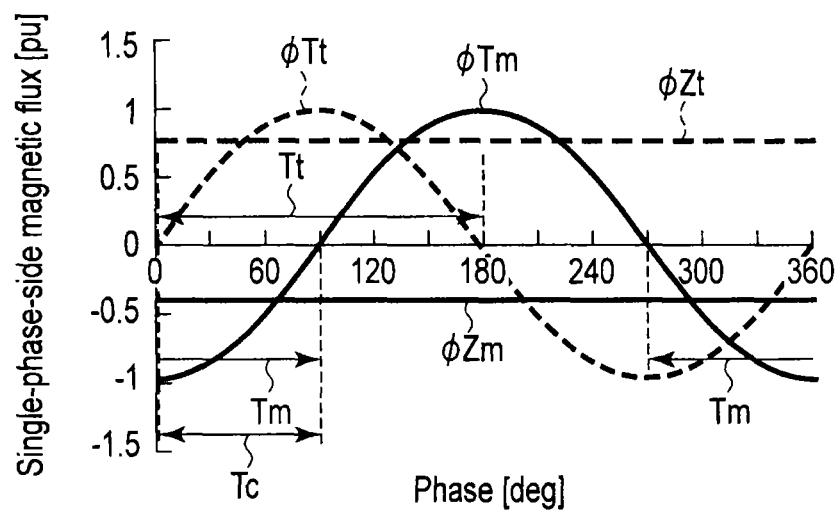
F I G. 10B

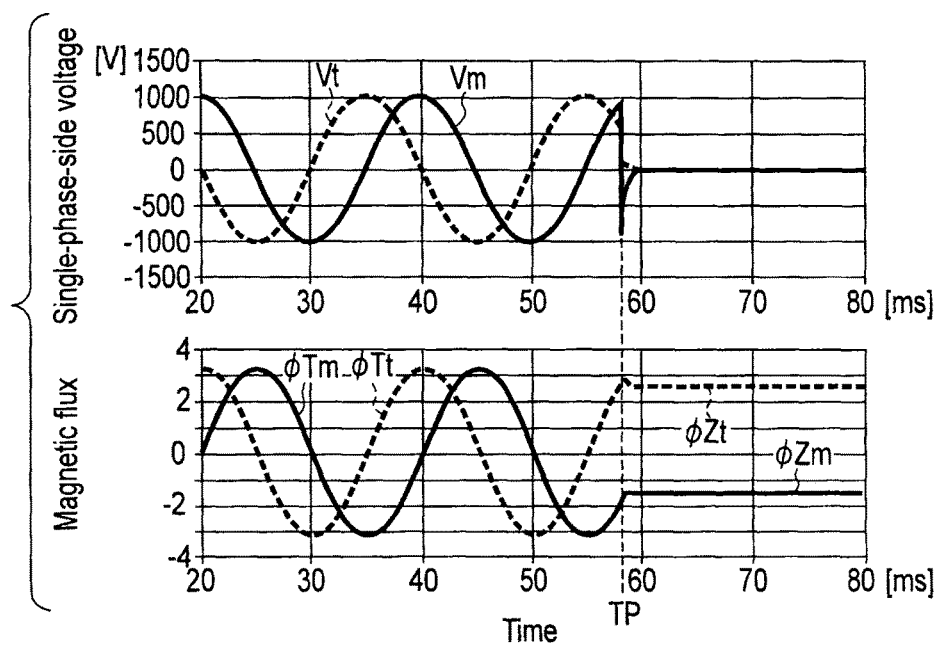
F I G. 11

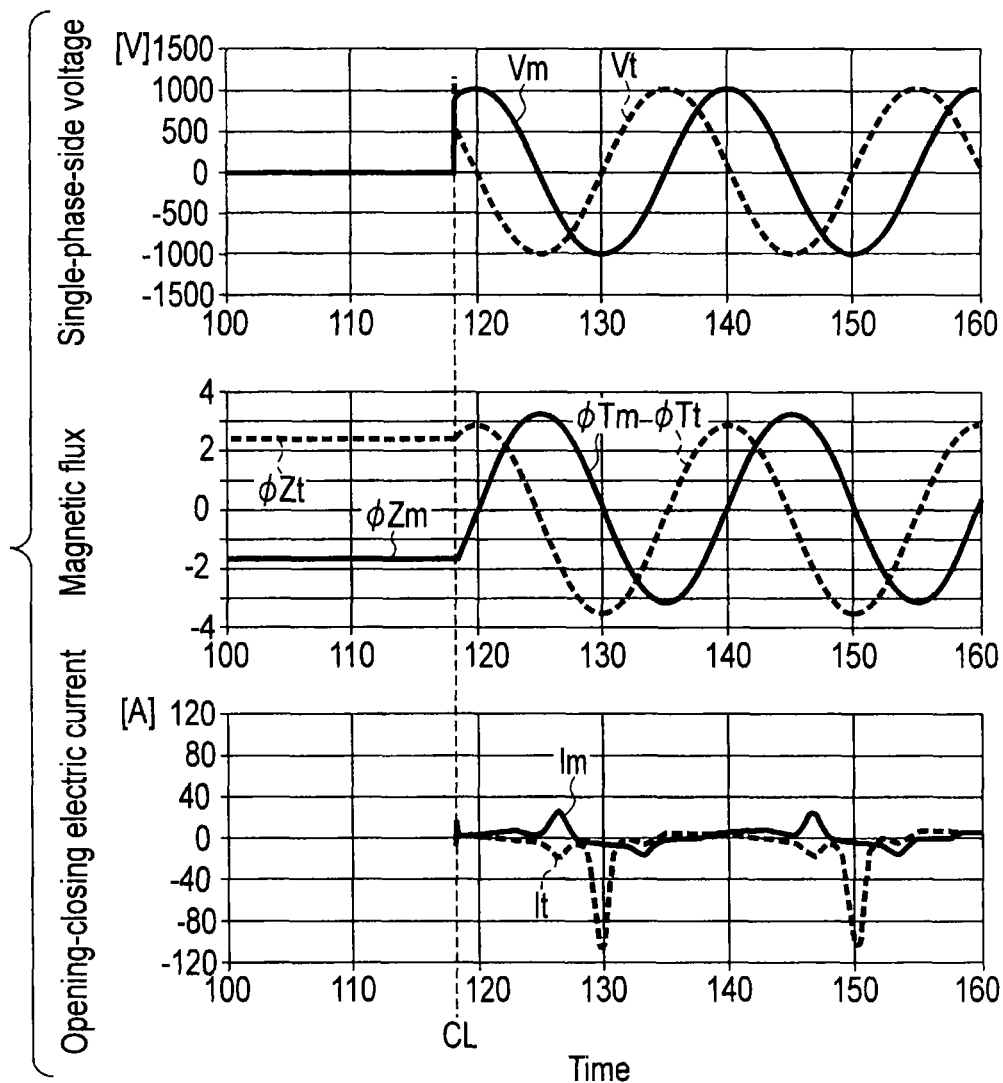
F I G. 12A

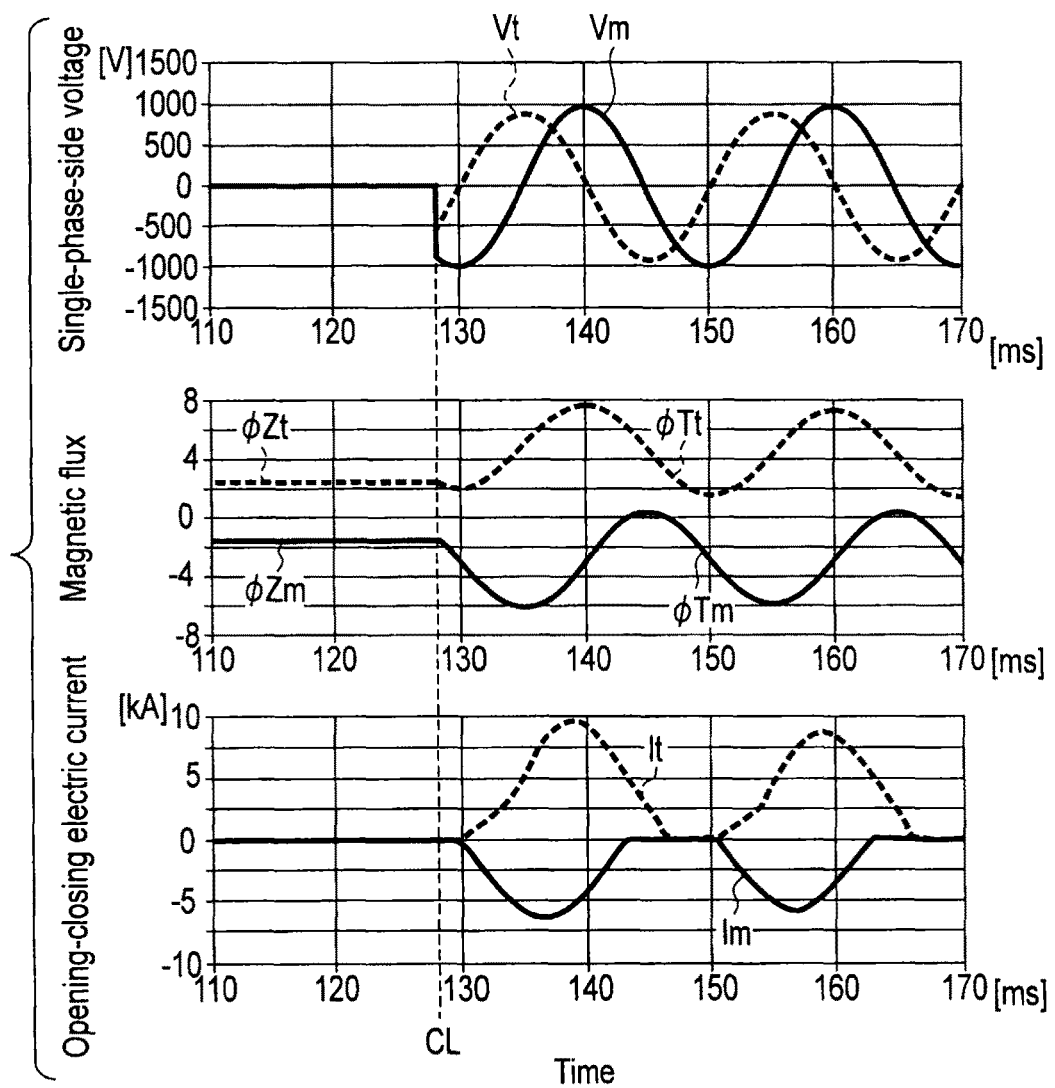
F I G. 12B

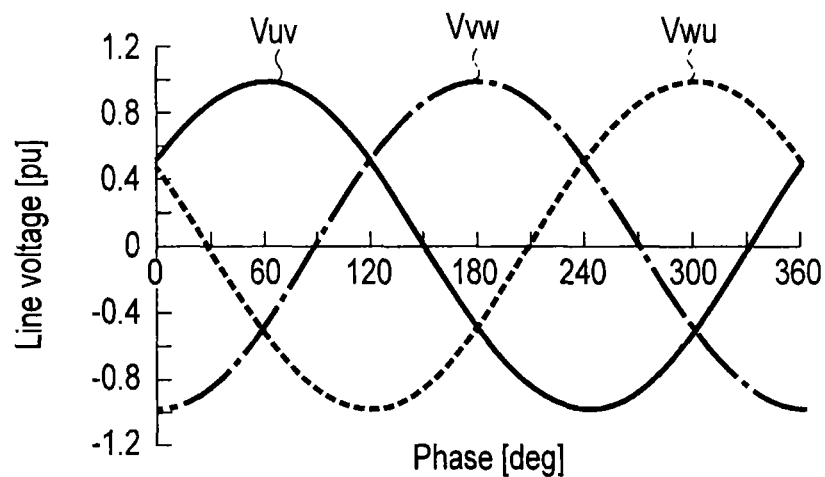
F I G. 14A
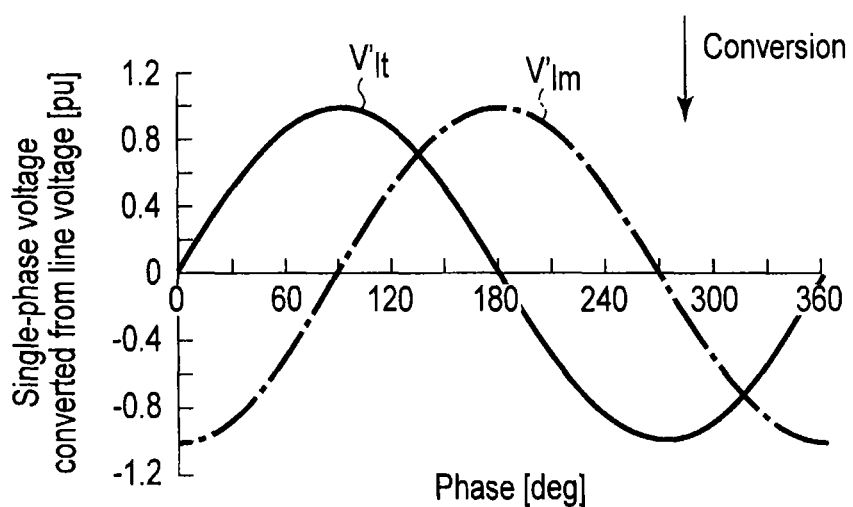
F I G. 14B

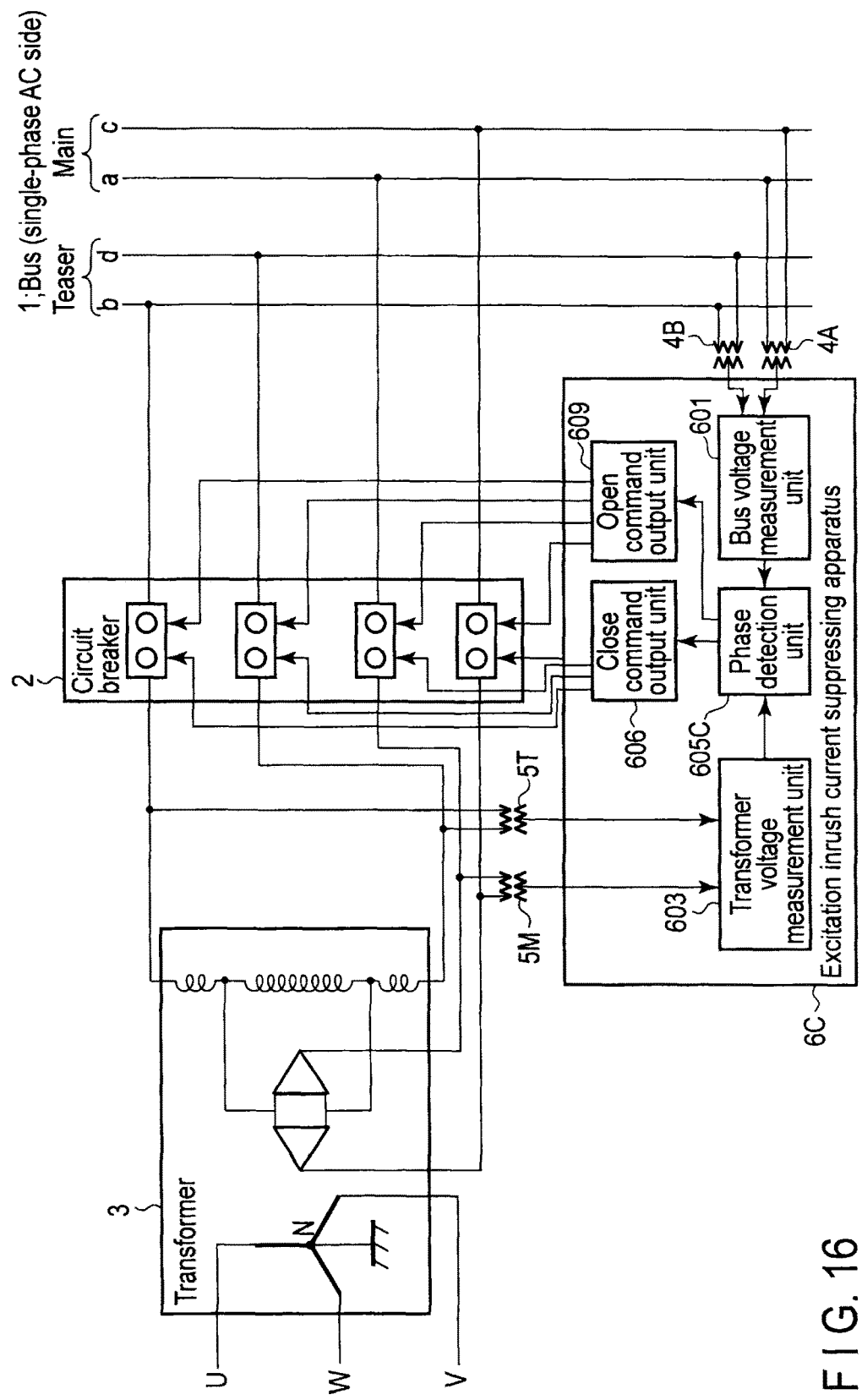
F I G. 16

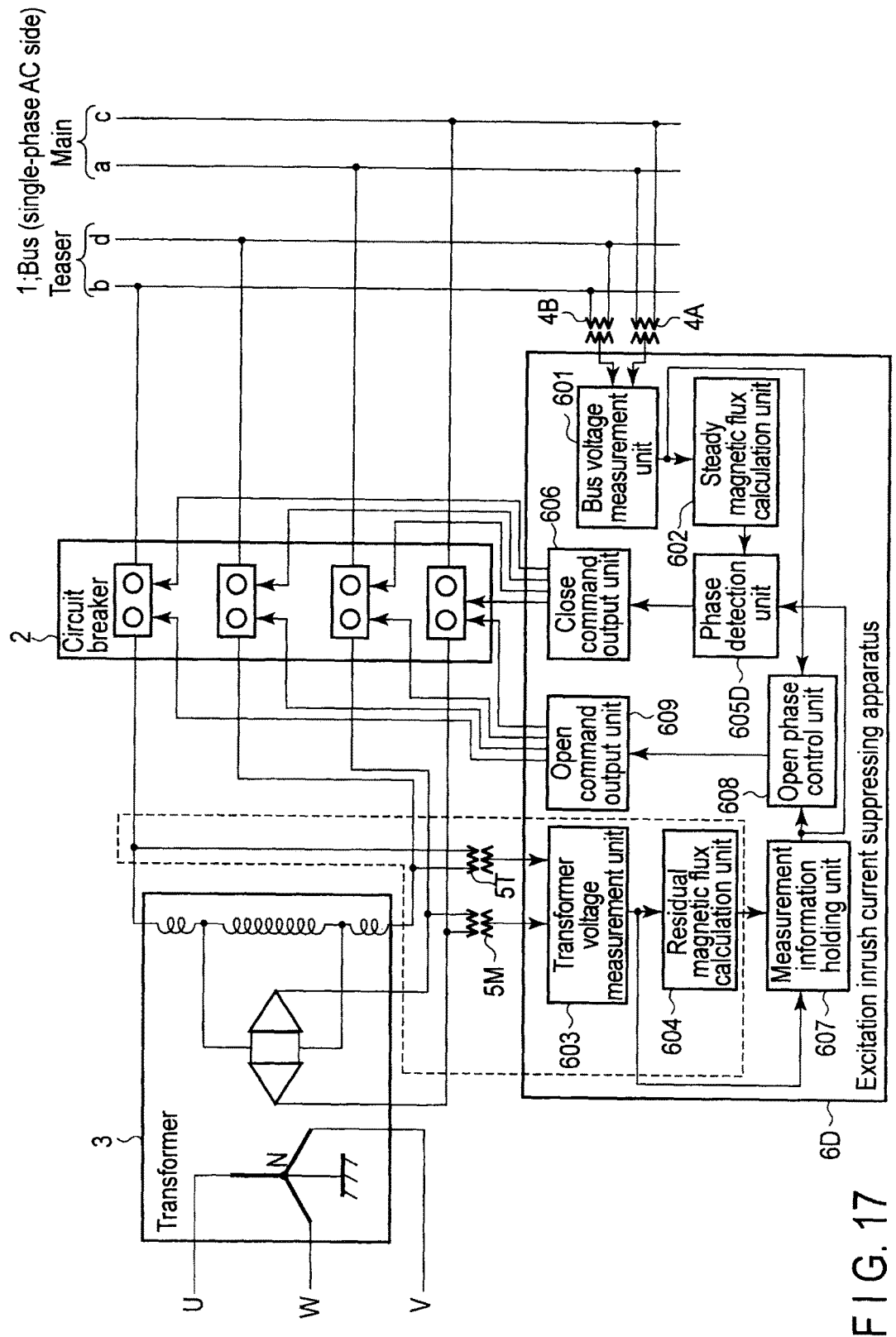
F I G. 17

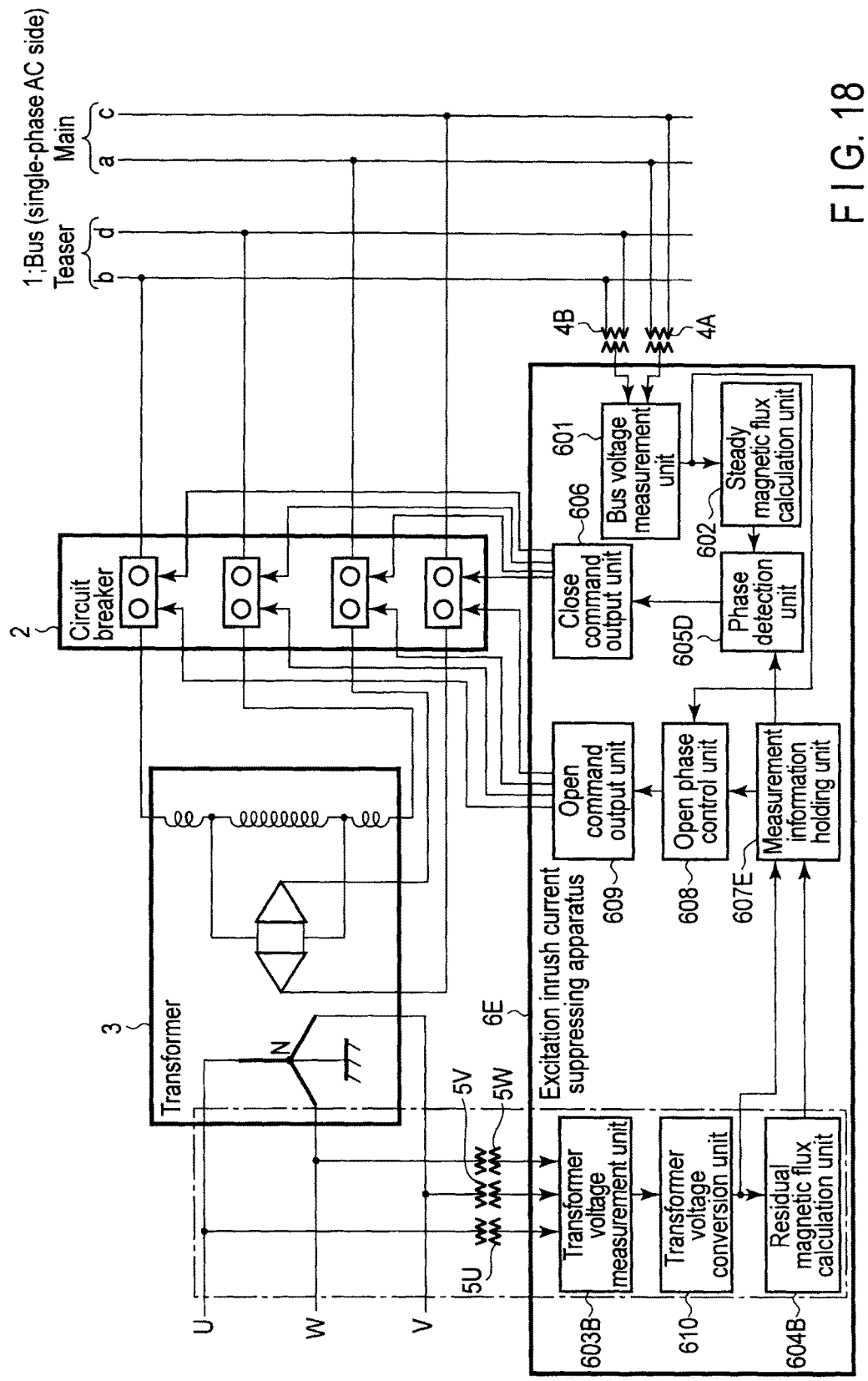
F I G. 18

EXCITATION INRUSH CURRENT SUPPRESSING APPARATUS AND EXCITATION INRUSH CURRENT SUPPRESSING METHOD

CROSS REFERENCE TO RELATED APPLICATIONS

This application is a Continuation Application of PCT Application No. PCT/JP2013/069635, filed Jul. 19, 2013 and based upon and claiming the benefit of priority from Japanese Patent Application No. 2012-160483, filed Jul. 19, 2012, the entire contents of all of which are incorporated herein by reference.

FIELD

Embodiments described herein relate generally to an excitation inrush current suppressing apparatus and excitation inrush current suppressing method for suppressing an excitation inrush current generated when performing non-load excitation by powering on a transformer.

BACKGROUND

It is generally known that a large excitation inrush current may flow when non-load excitation is performed by powering on a transformer while the core of the transformer has a residual magnetic flux. The magnitude of this excitation inrush current is several times as large as the rated load current of the transformer. The voltage of a power system fluctuates if a large excitation inrush current like this flows. If this voltage fluctuation is large, it may have an influence on users.

As a typical method of suppressing the above-mentioned excitation inrush current, a method in which a breaker is placed in a path for powering on a transformer is known. This breaker can make a contact with a resistor obtained by connecting an input resistance in series with a contact. The breaker is so configured as to suppress an excitation inrush current by connecting the contact with a resistor in parallel to a main contact, and turning on the contact with a resistor earlier than the main contact.

On the other hand, a directly grounded three-phase transformer is sometimes powered on via three single-phase breakers. In this case, a method of suppressing an excitation inrush current by first closing one arbitrary phase and then closing the two remaining phases is already known. Also, as a method of suppressing an excitation inrush current when powering on a three-phase transformer installed in a power system by using a three-phase integrated type breaker, a method which measures the value of a magnetic flux remaining in the core when the transformer is shut down and controls an excitation inrush current generated by power-on of the transformer by using the close phase of the breaker is known.

When supplying power to a single-phase AC apparatus such as a single-phase electric furnace or single-phase AC vehicle, a transformer obtained by a Scott connection, Woodbridge connection, modified Woodbridge connection, or roof-delta connection is used in order to convert a three-phase AC voltage into a single-phase AC voltage. By contrast, the excitation inrush current suppressing method using the breaker having the contact with a resistor requires the addition of the contact with a resistor when compared to an ordinary breaker. Consequently, the size of the whole system increases. The target of any other method is a three-phase transformer, and each method assumes a transformer which converts a three-phase AC voltage into a single-phase AC voltage as described above. Accordingly, none of these methods can be used.

It is, therefore, an object of the present invention to provide an excitation inrush current suppressing apparatus and excitation inrush current suppressing method capable of suppressing an excitation inrush current generated when connecting a transformer which converts a three-phase AC voltage into a single-phase AC voltage to a single-phase AC-side power system.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing the configuration of a power system including an excitation inrush current suppressing apparatus according to the first embodiment.

FIG. 5B is a view showing the voltage vectors of phase voltages and line voltages on the three-phase side.

FIG. 5C is a view showing the voltage vectors of the single-phase-side voltages of the main transformer and teaser transformer.

FIG. 6A is a view showing the voltage waveforms of the three-phase-side line voltages shown in FIGS. 5B and 5C.

FIG. 6B is a view showing the voltage waveforms of the three-phase-side phase voltages shown in FIGS. 5B and 5C.

FIG. 6C is a view showing the voltage waveforms of the single-phase-side voltages of the main transformer and teaser transformer.

FIG. 7 is a view showing the relationship between the cutoff phase and the residual magnetic fluxes on the single-phase side when shutting down a modified-Woodbridge-connected transformer according to the first embodiment.

FIG. 8A is a view showing excitation inrush currents flowing through a circuit breaker due to the relationship between the cutoff phase (0°) of the modified-Woodbridge-connected transformer and the close phase according to the first embodiment.

FIG. 8B is a view showing excitation inrush currents flowing through the circuit breaker due to the relationship between the cutoff phase (60°) of the modified-Woodbridge-connected transformer and the close phase according to the first embodiment.

FIG. 10A is a waveform chart showing transformer single-phase-side voltages.

FIG. 10B is a waveform chart showing a close phase range within which the excitation inrush current suppressing apparatus can suppress excitation inrush currents.

FIG. 11 is a view showing transformer single-phase-side voltages and magnetic fluxes when opening a steadily operating transformer by using a circuit breaker.

FIG. 12A is a waveform chart showing transformer single-phase-side voltages, magnetic fluxes, and excitation inrush currents flowing through circuit breakers when simultaneously closing circuit breakers within the close phase range shown in FIG. 10.

FIG. 12B is a waveform chart showing transformer single-phase-side voltages, magnetic fluxes, and excitation inrush currents flowing through the circuit breaker when simultaneously closing the circuit breaker within the close phase range shown in FIG. 10.

FIG. 14A is a view showing three-phase-side line voltages according to the third embodiment.

FIG. 14B is a view showing single-phase-side voltages converted from the three-phase-side line voltages according to the third embodiment.

FIG. 16 is a view showing the configuration of a power system including an excitation inrush current suppressing apparatus according to the fourth embodiment.

FIG. 17 is a view showing the configuration of a power system including an excitation inrush current suppressing apparatus according to the fifth embodiment.

FIG. 18 is a view showing the configuration of a power system including an excitation inrush current suppressing apparatus according to the sixth embodiment.

DETAILED DESCRIPTION

Figure 2:
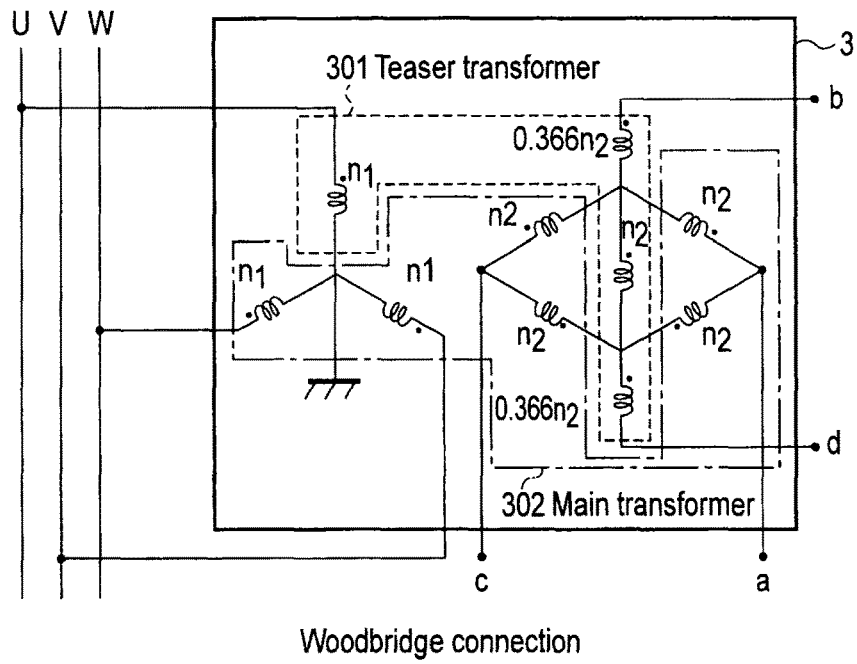
FIG. 2 is a view showing a transformer shown in FIG. 1 (when using a Woodbridge connection).

In general, according to one embodiment, an excitation inrush current suppressing apparatus which is used in a power system for selectively connecting and disconnecting a transformer includes a main transformer and a teaser transformer and which converts a three-phase AC voltage into a single-phase AC voltage to and from a single-phase AC-side bus by closing and opening a contact of a single-phase AC-side circuit breaker, and which suppresses an excitation inrush current generated when connecting the transformer, comprising: bus voltage measurement equipment which measures each phase voltage of the single-phase AC-side bus; transformer voltage measurement equipment which measures a single-phase-side voltage of the transformer; phase detector which detects a cutoff phase when opening the circuit breaker by monitoring each phase voltage measured by the bus voltage measurement equipment and the single-phase-side voltage measured by the transformer voltage measurement equipment, holds the detected cutoff phase, and outputs the same phase as the held cutoff phase; and close command output device which closes the circuit breaker by the same voltage phase as the cutoff phase output from the phase detector.

Embodiments will be explained with reference to the accompanying drawings.

(First Embodiment)

FIG. 1 is a block diagram showing the configuration of a power system including an excitation inrush current suppressing apparatus 6 according to the first embodiment. Note that the same reference numerals denote the same parts in the following drawings, a detailed explanation thereof will be omitted, and different portions will mainly be described. A repetitive explanation will be omitted in the subsequent embodiments as well.

The power system shown in FIG. 1 includes a single-phase AC-side bus 1, a circuit breaker (so-called breaker) 2, a modified-Woodbridge-connected transformer 3 which converts a three-phase AC voltage into a single-phase AC voltage, bus voltage detectors 4A and 4B connected to the bus 1, and transformer single-phase-side voltage detectors 5M and 5T and an excitation inrush current suppressing apparatus 6 installed on the secondary side (single-phase side) of the modified-Woodbridge-connected transformer 3.

The single-phase-side AC bus 1 is a power system bus which supplies, to a load, a single-phase AC voltage obtained by converting the three-phase AC voltage of a power supply bus (not shown) of a three-phase AC-side power system by the transformer 3. The single-phase AC-side bus 1 will be referred to as a bus 1 hereinafter.

The circuit breaker 2 is installed between the bus 1 and modified-Woodbridge-connected transformer 3, and operates the opening/closing of the main contact of each phase of the bus 1. That is, the transformer 3 is connected to the bus 1 when the circuit breaker 2 is closed. Also, the transformer 3 is disconnected from the bus 1 when the circuit breaker 2 is opened.

The bus voltage detectors 4A and 4B detect phase voltages Va and Vb of the bus 1. The bus voltage detectors 4A and 4B supply detection signals of the detected phase voltages Va and Vb to a bus voltage measurement unit 601 of the excitation inrush current suppressing apparatus 6. The transformer single-phase-side voltage detectors 5M and 5T detect single-phase-side voltages Vm and Vt of the transformer 3. The transformer single-phase-side voltage detectors 5M and 5T supply detection signals of the detected single-phase-side voltages Vm and Vt to a transformer voltage measurement unit 603 of the excitation inrush current suppressing apparatus 6.

In the excitation inrush current suppressing apparatus 6, the bus voltage measurement unit (the bus voltage measurement equipment) 601 measures the phase voltages Va and Vb of the bus 1 based on the detection signals of the phase voltages of the bus 1 detected by the bus voltage detectors 4A and 4B. The bus voltage measurement unit 601 supplies the measured phase voltages Va and Vb to a phase detection unit 605.

The transformer voltage measurement unit (the transformer voltage measurement equipment) 603 measures the single-phase-side voltages Vm and Vt of the modified-Woodbridge-connected transformer 3 based on the detection signals of the single-phase-side voltages Vm and Vt of the transformer 3 detected by the transformer single-phase-side voltage detectors 5M and 5T. The transformer voltage measurement unit 603 supplies the measured single-phase-side voltages Vm and Vt to the phase detection unit (the phase detector) 605.

The phase detection unit (the phase detector) 605 monitors the phase voltages Va and Vb of the bus 1 measured by the bus voltage measurement unit 601, and the single-phase-side voltages Vm and Vt of the modified-Woodbridge-connected transformer 3 measured by the transformer voltage measurement unit 603, thereby storing the voltage phase (cutoff phase) when the circuit breaker 2 lastly shuts down the transformer 3. Then, based on the phase voltages Va and Vb of the bus 1 measured by the bus voltage measurement unit 601, the phase detection unit 605 detects the same phase as the stored cutoff phase. The phase detection unit 605 supplies the detected phase to a close command output unit (the close command output device) 606.

The close command output unit (the close command output device) 606 receives the phase detected by the phase detection unit 605 as a close phase, and outputs a close command to an operating mechanism for driving the main contact of the circuit breaker 2. As a consequence, the transformer 3 is connected to the bus 1.

A case in which the modified-Woodbridge-connected transformer 3 is used will be explained in this embodiment, but it is also possible to use transformers using connections shown in FIGS. 2, 3, and 4.

Figure 3:
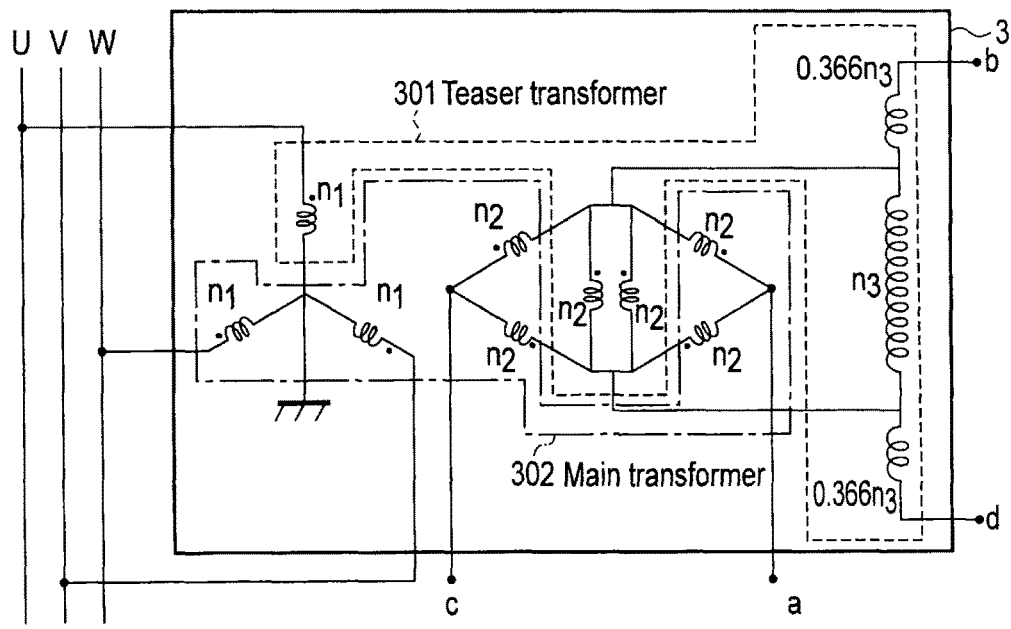
FIG. 3 is a view showing the transformer shown in FIG. 1 (when using a modified Woodbridge connection).
Figure 4:
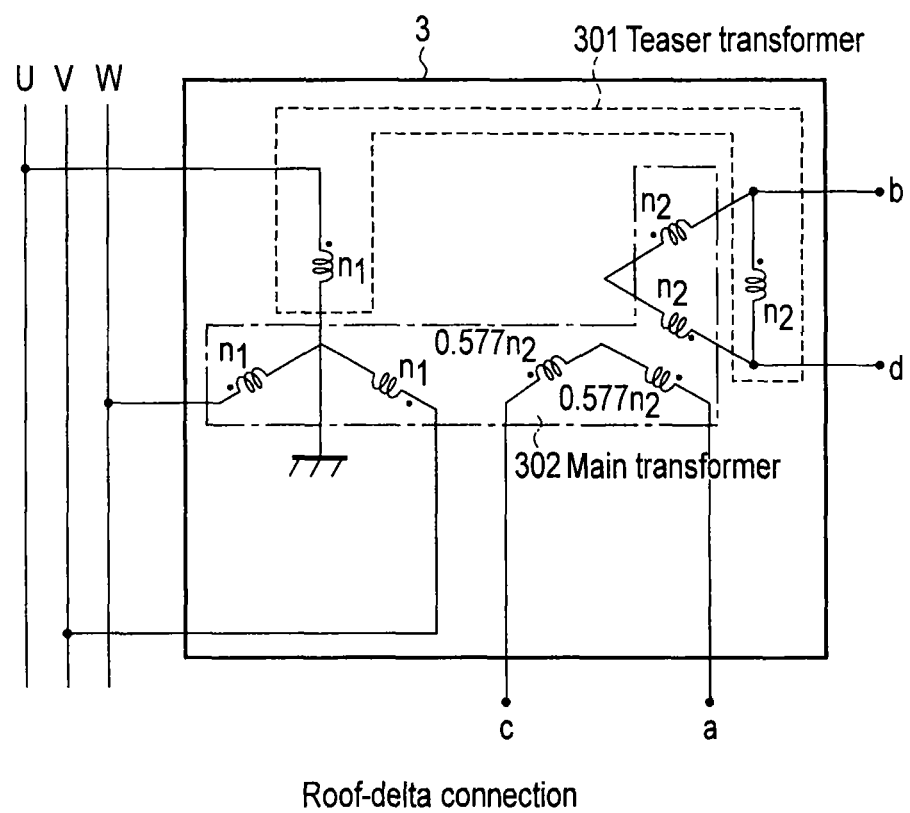
FIG. 4 is a view showing the transformer shown in FIG. 1 (when using a roof-delta connection).

FIG. 2 shows a Woodbridge-connected transformer, FIG. 3 shows a modified-Woodbridge-connected transformer, and FIG. 4 shows a roof-delta-connected transformer. As the transformer 3 according to the first embodiment, it is also possible to use the Woodbridge-connected transformer shown in FIG. 2 or the roof-delta-connected transformer shown in FIG. 4, instead of the modified-Woodbridge-connected transformer shown in FIG. 3. However, the transformation result is the same as that of the modified-Woodbridge-connected transformer. Accordingly, it is assumed that the Woodbridge-connected transformer and roof-delta-connected transformer can replace the modified-Woodbridge-connected transformer unless otherwise specified. This replacement to the modified-Woodbridge-connected transformer similarly applies to the following embodiments.

In the Woodbridge-connected transformer shown in FIG. 2, the turn ratio of only one phase on the single-phase side is 1:0.366:0.366. In the modified-Woodbridge-connected transformer shown in FIG. 3, an autotransformer is connected to only one phase on the single-phase side. The roof-delta-connected transformer shown in FIG. 4 is formed by combining a roof connection and delta connection on the single-phase side, and the roof connection and delta connection are electrically insulated. Also, as shown in FIGS. 2, 3, and 4, the transformer 3 includes a main transformer 302 and teaser transformer 301. The main transformer 302 is also called a main transformer.

The operation of the power system having the above configuration will be explained with reference to FIGS. 5A, 5B, 5C, 6A, 6B, 6C, 7, 8A, 8B, 8C, and 8D.

Figure 5A:
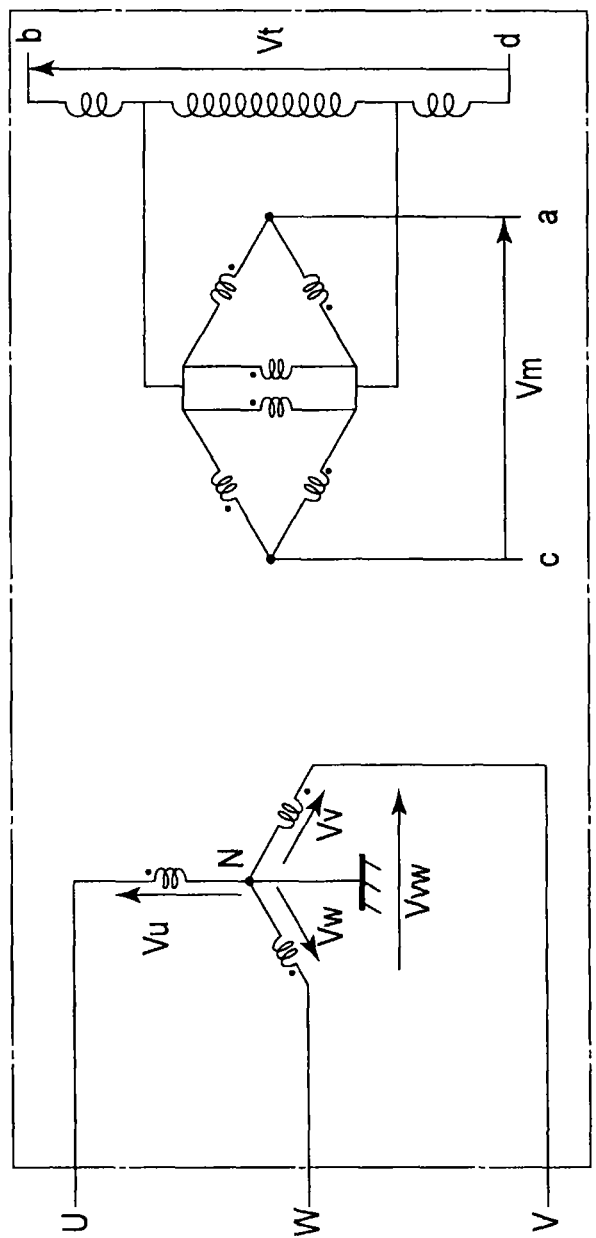
FIG. 5A is a view showing phase voltages and a line voltage on the three-phase side and the single-phase-side voltages of a main transformer and teaser transformer in a steady operation of the modified-Woodbridge-connected transformer 3 shown in FIG. 3.
Figure 8C:
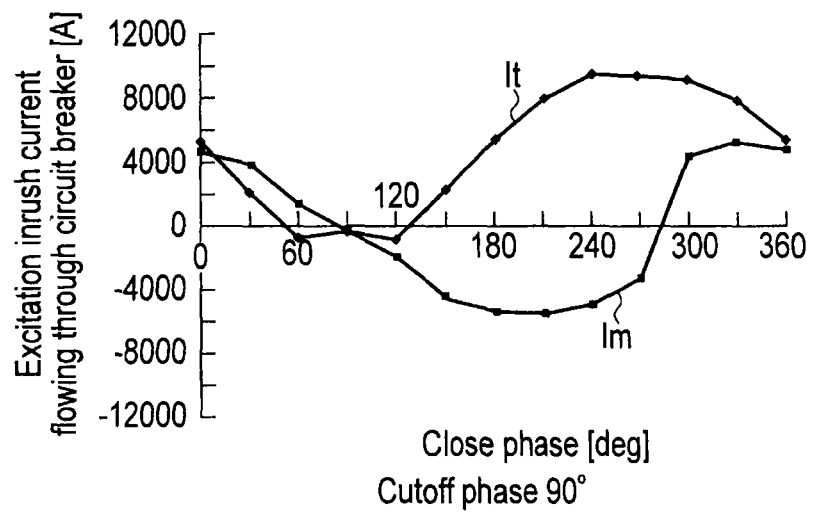
FIG. 8C is a view showing excitation inrush currents flowing through the circuit breaker due to the relationship between the cutoff phase (90°) of the modified-Woodbridge-connected transformer and the close phase according to the first embodiment.
Figure 8D:
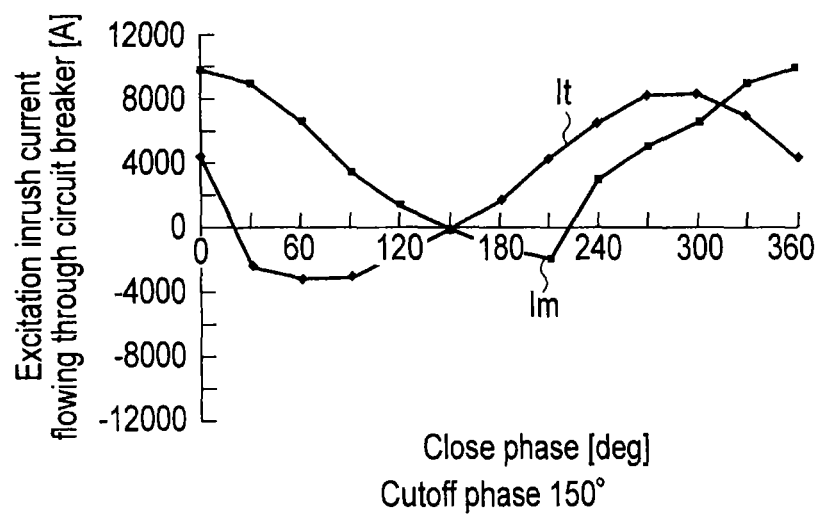
FIG. 8D is a view showing excitation inrush currents flowing through the circuit breaker due to the relationship between the cutoff phase (150°) of the modified-Woodbridge-connected transformer and the close phase according to the first embodiment.

FIG. 5A is a view showing phase voltages Vu, Vv, and Vw and line voltages Vvw, Vwu, and Vuv on the three-phase side and single-phase-side voltages Vm and Vt of each of the main transformer 302 and teaser transformer 301 in a steady operation of the modified-Woodbridge-connected transformer shown in FIG. 3. FIG. 5B is a view showing the voltage vectors of the phase voltages Vu, Vv, and Vw and line voltages Vvw, Vwu, and Vuv on the three-phase side. FIG. 5C is a view showing the voltage vectors of the single-phase-side voltages Vm and Vt of each of the main transformer 302 and teaser transformer 301. Also, FIGS. 6A, 6B, and 6C are views showing the voltage waveforms of the phase voltages Vu, Vv, and Vw and line voltages Vvw, Vwu, and Vuv on the three-phase side shown in FIG. 5B, and the voltage waveforms of the single-phase-side voltages Vm and Vt of each of the main transformer 302 and teaser transformer 301 shown in FIG. 5C.

As shown in FIGS. 6A, 6B, and 6C, in the main transformer 302, the three-phase-side line voltage Vvw has the same phase as that of the voltage Vm to be applied between single-phase-side terminals a and c. In the teaser transformer 301, the three-phase-side phase voltage Vu has the same phase as that of the voltage Vt to be applied between the single-phase-side terminal b and a single-phase-side terminal d. The phase of the phase voltage Vu has advanced by 90° from that of the line voltage Vvw. Accordingly, the phase of the single-phase-side voltage Vt of the teaser transformer 301 advances by 90° from that of the single-phase-side voltage Vm of the main transformer 302.

Under the above-mentioned conditions, the detection signals of the phase voltages Va and Vb of the bus 1 detected by the bus voltage detectors 4A and 4B are supplied to the bus voltage measurement unit 601 of the excitation inrush current suppressing apparatus 6. Also, the detection signals of the single-phase-side voltages Vm and Vt of the transformer 3 detected by the transformer single-phase-side voltage detectors 5M and 5T are supplied to the transformer voltage measurement unit 603 of the excitation inrush current suppressing apparatus 6.

In the excitation inrush current suppressing apparatus 6, the phase voltages Va and Vb of the bus 1 measured by the bus voltage measurement unit 601 are supplied to the phase detection unit 605. Also, the single-phase-side voltages Vm and Vt measured by the transformer voltage measurement unit 603 are supplied to the phase detection unit 605.

The phase detection unit 605 monitors the phase voltages Va and Vb of the bus 1 measured by the bus voltage measurement unit 601 and the single-phase-side voltages Vm and Vt of the modified-Woodbridge-connected transformer 3 measured by the transformer voltage measurement unit 603, and stores the voltage phase (cutoff phase) when the circuit breaker 2 lastly shuts down the transformer 3. Then, the phase detection unit 605 detects the same phase as the stored cutoff phase, for the phase voltages Va and Vb of the bus 1 measured by the bus voltage measurement unit 601. The detected phase is supplied to the close command output unit 606, and the close command output unit 606 outputs a close command to the operating mechanism for driving the main contact of the circuit breaker 2 by using the detected phase as a close phase. Consequently, the circuit breaker 2 is closed, and the transformer 3 is connected to the bus 1.

FIG. 7 is a view showing the relationship between the cutoff phase and residual magnetic fluxes φm and φt on the single-phase side when the modified-Woodbridge-connected transformer 3 according to the first embodiment is shut down. When the single-phase AC voltages Vm and Vt are applied in a steady state, the residual magnetic fluxes φm and φt shown in FIG. 7 indicate residual magnetic fluxes φm and φt when the cutoff phase is changed to 360° by 30° at one time based on a phase $\theta_0$ (0°) shown in FIG. 6. As shown in FIG. 7, the single-phase-side residual magnetic fluxes φm and φt of the modified-Woodbridge-connected transformer 3 change in accordance with the cutoff phase.

Next, the suppression of excitation inrush currents Im and It by the excitation inrush current suppressing apparatus 6 will be explained with reference to FIGS. 8A, 8B, 8C, and 8D.

FIGS. 8A, 8B, 8C, and 8D are views showing the excitation inrush currents Im and It flowing through the circuit breaker 2 due to the relationship between the cutoff phase and close phase of the modified-Woodbridge-connected transformer 3 according to the first embodiment. Referring to FIGS. 8A, 8B, 8C, and 8D, the excitation inrush current Im indicates a main, single-phase-side excitation inrush current, and the excitation inrush current It indicates a teaser single-phase-side excitation inrush current. FIGS. 8A, 8B, 8C, and 8D respectively show changes in excitation inrush currents Im and It when the cutoff phases are 0°, 60°, 90°, and 150°. FIGS. 8A, 8B, 8C, and 8D demonstrate that the excitation inrush currents Im and It are suppressed most when the close phase and cutoff phase of the excitation inrush current suppressing apparatus 6 are the same, regardless of the value of the cutoff phase.

As described above, in the excitation inrush current suppressing apparatus 6 of the first embodiment, the three-phase-side or single-phase-side voltage phase when the circuit breaker 2 lastly shuts down the transformer 3 is detected and stored. When powering on the transformer 3 after that, the excitation inrush current suppressing apparatus 6 closes the circuit breaker 2 in accordance with the stored phase. Accordingly, the excitation inrush current suppressing apparatus 6 can suppress the excitation inrush currents Im and It.

Note that when closing the circuit breaker 2, the power-on time of the transformer 3 varies due to, e.g., a preceding discharge called pre-arc which occurs between the main contacts or an operation variation of the operating mechanism. If this power-on variation caused by pre-arc or the variation when closing the circuit breaker 2 poses a problem, it is only necessary to acquire the variation characteristic beforehand, and correct the variation when controlling the close phase of the circuit breaker 2.

Accordingly, these variations do not disturb the suppression of the excitation inrush currents Im and It.

(Second Embodiment)

Figure 9:
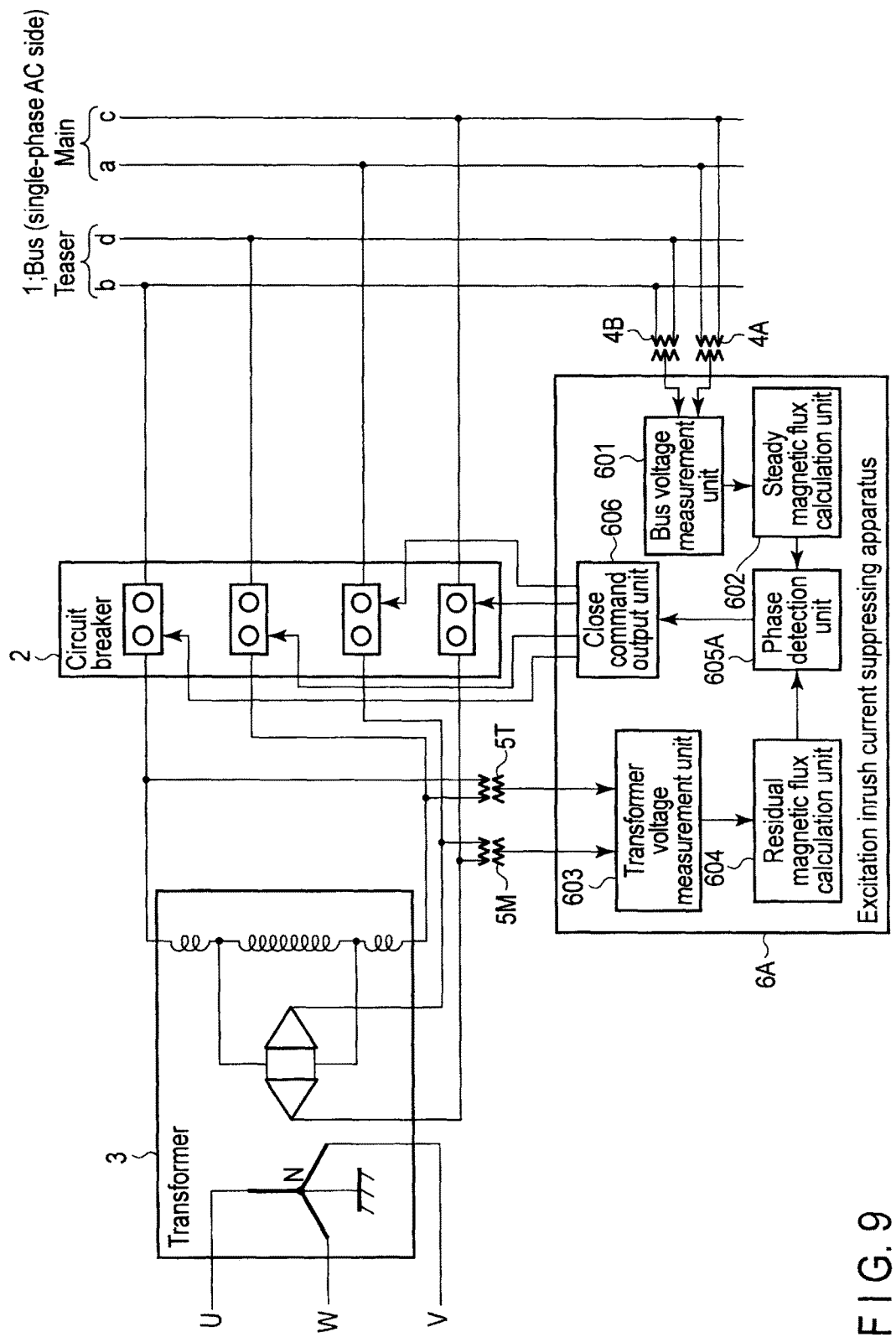
FIG. 9 is a view showing the configuration of a power system including an excitation inrush current suppressing apparatus according to the second embodiment.

FIG. 9 is a block diagram showing the configuration of a power system including an excitation inrush current suppressing apparatus 6A according to the second embodiment. The excitation inrush current suppressing apparatus 6A shown in FIG. 9 includes a phase detection unit (a phase detector) 605A instead of the phase detection unit 605 of the first embodiment. Also, the excitation inrush current suppressing apparatus 6A additionally includes a steady magnetic flux calculation unit (a steady magnetic flux calculator) 602 and residual magnetic flux calculation unit (a residual magnetic flux calculator) 604. The rest of the arrangement is the same as that of the excitation inrush current suppressing apparatus 6 according to the first embodiment.

In the excitation inrush current suppressing apparatus 6A, the steady magnetic flux calculation unit 602 integrates phase voltages Va and Vb of a bus 1 measured by a bus voltage measurement unit 601, thereby calculating magnetic fluxes $\phi Tm$ and $\phi Tt$ in a steady state. The steady magnetic flux calculation unit 602 supplies the calculated steady magnetic fluxes $\phi Tm$ and $\phi Tt$ to the phase detection unit 605A.

The residual magnetic flux calculation unit 604 integrates single-phase-side voltages Vm and Vt measured by a transformer voltage measurement unit 603, thereby calculating residual magnetic fluxes $\phi Zm$ and $\phi Zt$. The residual magnetic flux calculation unit 604 supplies the calculated residual magnetic fluxes $\phi Zm$ and $\phi Zt$ to the phase detection unit 605A.

The phase detection unit 605A receives the calculated steady magnetic fluxes $\phi Tm$ and $\phi Tt$ calculated by the steady magnetic flux calculation unit 602 and the residual magnetic fluxes $\phi Zm$ and $\phi Zt$ calculated by the residual magnetic flux calculation unit 604, and identifies phase sections Tm and Tt in which the polarities of the input steady magnetic fluxes $\phi Tm$ and $\phi Tt$ and residual magnetic fluxes $\phi Zm$ and $\phi Zt$ match. In addition, the phase detection unit 605A identifies a close phase range Tc based on the detected phase sections Tm and Tt. The phase detection unit 605A supplies the identified close phase range Tc to a close command output unit 606.

The close command output unit 606 determines a close phase within the close phase range Tc identified by the phase detection unit 605A, and outputs a close command to an operating mechanism for driving the main contact of each phase of a circuit breaker 2.

Next, the suppression of excitation inrush currents Im and It by the excitation inrush current suppressing apparatus 6 will be explained with reference to FIGS. 10A, 10B, 11, 12A, and 12B.

In the excitation inrush current suppressing apparatus 6 shown in FIG. 9, when a voltage is applied to a transformer 3 in a steady state, the steady magnetic flux calculation unit 602 integrates the phase voltages Va and Vb measured by the bus voltage measurement unit 601, thereby calculating the steady magnetic fluxes $\phi Tm$ and $\phi Tt$ on the single-phase side of a main transformer and teaser transformer. On the other hand, in the excitation inrush current suppressing apparatus 6, the transformer voltage measurement unit 603 measures the transformer single-phase-side voltages Vm and Vt when the circuit breaker 2 shuts down the transformer 3 to which a voltage is applied in a steady state. The residual magnetic fluxes $\phi Zm$ and $\phi Zt$ are calculated by integrating the measured transformer single-phase-side voltages Vm and Vt. The above-mentioned main and teaser steady magnetic fluxes are known. Therefore, a section in which the main and teaser polarities match, i.e., the close phase range Tc in which the polarities of the steady magnetic flux and residual magnetic flux are the same and the phases overlap is identified.

FIGS. 10A and 10B are waveform charts showing the voltages Vm and Vt on the transformer single-phase side, and the close phase range in which the excitation inrush current suppressing apparatus can suppress excitation inrush currents. $\phi Tm$ and $\phi Tt$ denote the steady magnetic fluxes calculated by the steady magnetic flux calculation unit 602. $\phi Zm$ and $\phi Zt$ denote the residual magnetic fluxes calculated by the residual magnetic flux calculation unit 604. Tm and Tt denote the phase sections in which the polarities of the steady magnetic fluxes $\phi Tm$ and $\phi Tt$ and residual magnetic fluxes $\phi Zm$ and $\phi Zt$ match. Tc denotes the close phase range in which excitation inrush currents can be suppressed. FIG. 11 is a waveform chart showing changes in single-phase-side voltages and magnetic fluxes before and after the circuit breaker 2 opens (TP) a steadily operating transformer. FIG. 12A is a waveform chart showing the transformer single-phase-side voltages Vm and Vt, the magnetic fluxes $\phi Tm$ and $\phi Tt$, and excitation inrush currents Im and It flowing through the circuit breaker 2, when the circuit breaker 2 is simultaneously closed (CL) within the close phase range Tc shown in FIG. 10 after the circuit breaker 2 is opened by the phase shown in FIG. 11. FIG. 12B is a waveform chart showing the transformer single-phase-side voltages Vm and Vt, the magnetic fluxes φTm and φTt, and the excitation inrush currents Im and It flowing through the circuit breaker 2, when the circuit breaker 2 is simultaneously closed (CL) outside the close phase range Tc shown in FIG. 10 after the circuit breaker 2 is opened by the phase shown in FIG. 11.

In this embodiment, the close phase is so controlled as to power on the transformer 3 by the circuit breaker 2 within the close phase range shown in FIG. 10. In this case, as shown in FIG. 12A, the transformer single-phase-side voltages Vm and Vt and transformer single-phase-side magnetic fluxes φTm and φTt appear, and the excitation inrush currents Im and It are at most 120 A. By contrast, when the circuit breaker 2 is simultaneously closed outside the close phase range Tc shown in FIG. 12B without controlling the close phase, the excitation inrush currents Im and It are at most 10 kA (=10000 A). This indicates that the excitation inrush currents Im and It are suppressed by controlling the close phase within the close phase range Tc shown in FIG. 10.

As described above, in the excitation inrush current suppressing apparatus 6A of the second embodiment, the section in which the polarities of the single-phase-side steady magnetic fluxes φTm and φTt and residual magnetic fluxes φZm and φZt match is set as the close phase range Tc, and the close phase of the circuit breaker 2 is determined within this range. Accordingly, the close command output unit 606 outputs the close command in accordance with the determined close phase, thereby closing the circuit breaker 2. As a consequence, the excitation inrush current suppressing apparatus 6A can suppress the excitation inrush currents Im and It generated when powering on the transformer 3.

Note that when closing the circuit breaker 2, the power-on time of the transformer 3 varies due to, e.g., a preceding discharge called pre-arc which occurs between the main contacts or an operation variation of the operating mechanism. A controller which performs phase control can correct this power-on variation caused by pre-arc or the variation when closing the circuit breaker 2 by acquiring the characteristics of these variations beforehand. Accordingly, these variations do not disturb the suppression of the excitation inrush currents Im and It.

Note also that in the excitation inrush current suppressing apparatus 6A at the time of power-on of the transformer 3, when closing the circuit breaker 2 on the single-phase AC side by a phase at which the steady magnetic flux φTm and residual magnetic flux φZm on the single-phase side of a main transformer 302 and the steady magnetic flux φTt and residual magnetic flux φZt on the single-phase side of a teaser transformer 301 almost match, it is also possible to individually close the circuit breaker 2.

(Third Embodiment)

Figure 13:
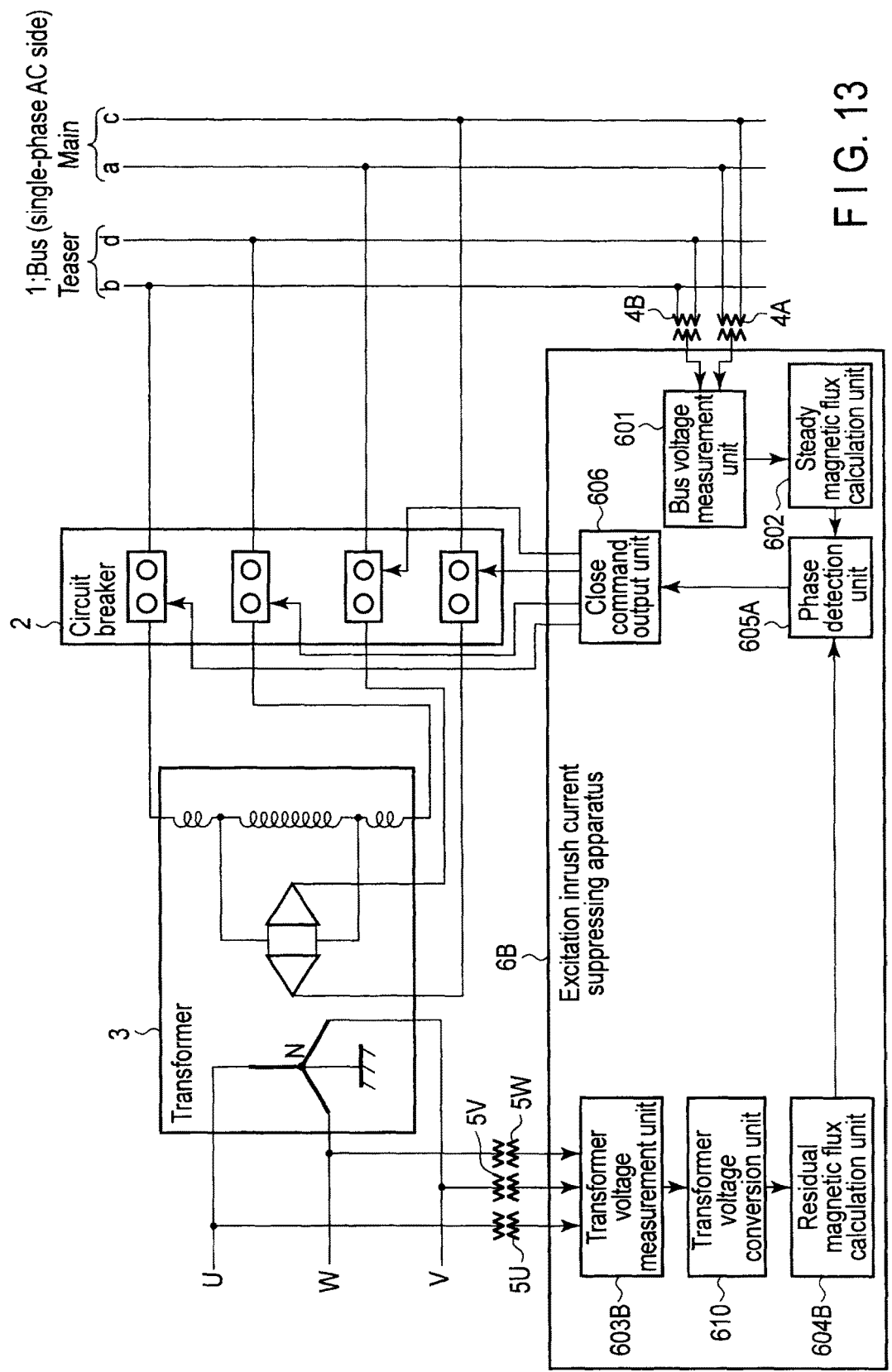
FIG. 13 is a view showing the configuration of a power system including an excitation inrush current suppressing apparatus according to the third embodiment.

FIG. 13 is a block diagram showing the configuration of a power system including an excitation inrush current suppressing apparatus 6B according to the third embodiment. The excitation inrush current suppressing apparatus 6B shown in FIG. 13 includes a transformer voltage measurement unit (a transformer voltage measurement equipment) 603B and residual magnetic flux calculation unit (a residual magnetic flux calculator) 604B, instead of the transformer voltage measurement unit 603 and residual magnetic flux calculation unit 604 of the second embodiment. Also, the excitation inrush current suppressing apparatus 6B additionally includes a transformer voltage conversion unit (a transformer voltage converter) 610. The rest of the arrangement is the same as that of the excitation inrush current suppressing apparatus 6A according to the second embodiment.

In the excitation inrush current suppressing apparatus 6B, the transformer voltage measurement unit 603B measures each voltage on the three-phase side of a modified-Wood-bridge-connected transformer 3 based on detection signals on the three-phase-voltage side of the transformer 3 detected by transformer three-phase-side voltage detectors 5U, 5V, and 5W. The three-phase-side voltages are three-phase-side line voltages Vvw, Vwu, and Vuv and three-phase-side phase voltages Vu, Vv, and Vw. The transformer voltage measurement unit 603B supplies the measured three-phase-side voltages of the transformer 3 to the transformer voltage conversion unit 610.

The transformer voltage conversion unit 610 converts the three-phase-side voltages of the transformer 3 input from the transformer voltage measurement unit 603B into single-phase-side voltages. The transformer voltage conversion unit 610 supplies converted single-phase-side voltages Vm and Vt to the residual magnetic flux calculation unit 604B.

The residual magnetic flux calculation unit 604B integrates the single-phase-side voltages Vm and Vt converted by the transformer voltage conversion unit 610, thereby calculating residual magnetic fluxes φZm and φZt. The residual magnetic flux calculation unit 604B supplies the calculated residual magnetic fluxes φZm and φZt to a phase detection unit 605A.

Next, the suppression of excitation inrush currents Im and It by the excitation inrush current suppressing apparatus 6B will be explained with reference to FIGS. 13, 14A, 14B, 14C, 15A, 15B, and 15C.

Figure 14C:
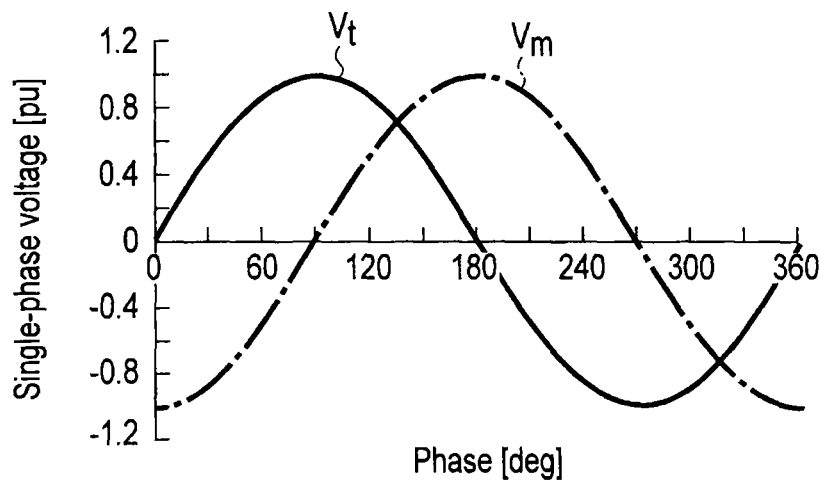
FIG. 14C is a view showing transformer single-phase-side voltages according to the third embodiment.

Referring to FIG. 13, when a single-phase AC voltage is applied to the transformer 3 in a steady state, the transformer voltage conversion unit 610 converts the transformer three-phase-side voltages measured by the transformer voltage measurement unit 603B into single-phase-side voltages. FIGS. 14A, 14B, and 14C are waveform charts showing the phase relationships between the three-phase-side line voltages Vuv, Vvw, and Vwu input to the transformer voltage conversion unit 610, single-phase-side voltages Vlm' and Vlt' converted by the transformer voltage conversion unit 610, and the transformer single-phase-side voltages Vm and Vt. The waveforms shown in FIGS. 14A, 14B, and 14C are indicated by per unit when the peak value is 1. The transformer voltage conversion unit 610 calculates the line voltages Vuv, Vvw, and Vwu based on the phase voltages measured by the transformer voltage measurement unit 603B, and converts the line voltages Vuv, Vvw, and Vwu into the transformer single-phase-side voltages Vlm' and Vlt'. The transformer single-phase-side voltages Vlm' and Vlt' converted by the transformer voltage conversion unit 610 are obtained by:

$$K = n_1/n_2 (n_1/n_2\text{:turn ratio}, k=1)$$

$$V'_{lm} = V_{vw}/k$$

$$V_u = K \times V'_{lt}/\sqrt{3}$$

$$V_u = (V_{uv} - V_{wu})/3$$

$$V'_{lt} = (V_{uv} - V_{wu})/k \times \sqrt{3}$$

$$\therefore V'_{lm} = V_{vw}$$

$$V'_{lt} = (V_{uv} - V_{wu})/\sqrt{3} = 0.5744 \times (V_{uv} - V_{wu}) \quad (1)$$

Vuv: a three-phase-side UV line voltage
Vvw: a three-phase-side line voltage
Vwu: a three-phase-side WU line voltage Vlm': a single-phase-side voltage of the main transformer converted from the three-phase-side line voltages Vlt': a single-phase-side voltage of the teaser transformer converted from the three-phase-side line voltages The single-phase-side voltages Vlm' and Vlt' converted by the transformer voltage conversion unit 610 are supplied to the residual magnetic flux calculation unit 604B.

Figure 15A:
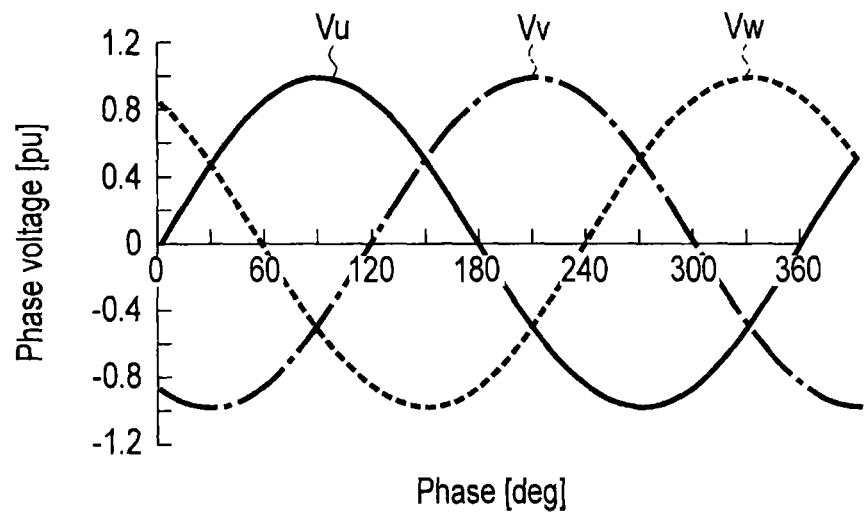
FIG. 15A is a view showing three-phase-side phase voltages according to the third embodiment.
Figure 15B:
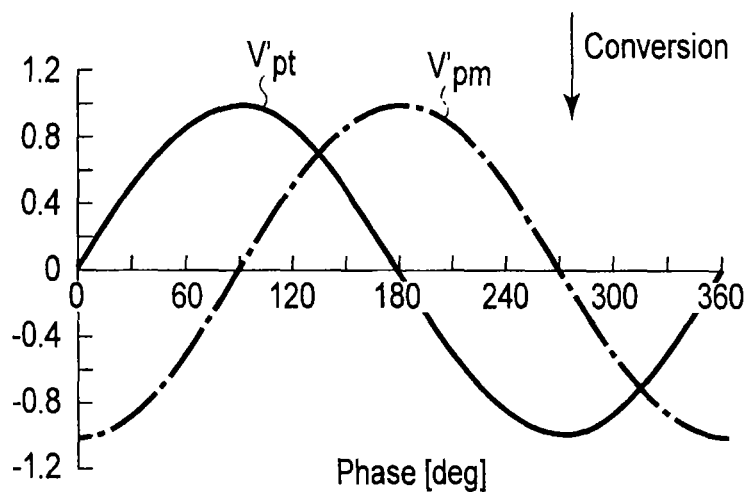
FIG. 15B is a view showing single-phase-side voltages converted from the three-phase-side phase voltages according to the third embodiment.
Figure 15C:
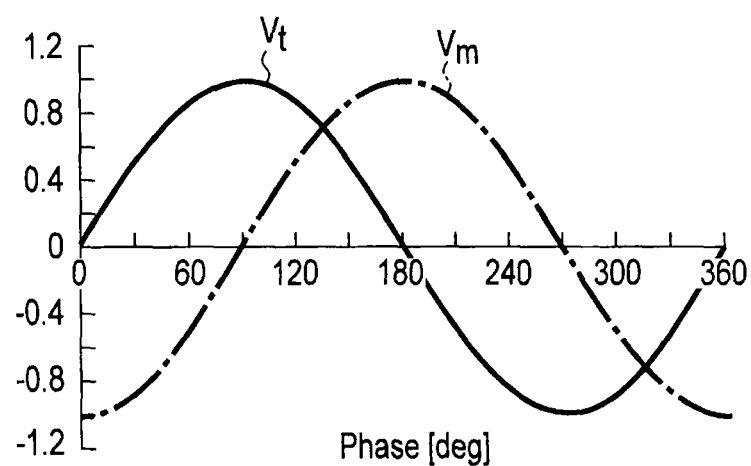
FIG. 15C is a view showing transformer single-phase-side voltages according to the third embodiment.

FIGS. 15A, 15B, and 15C are waveform charts showing the phase relationships between the three-phase-side voltages Vu, Vv, and Vw input to the transformer voltage conversion unit 610, single-phase-side voltages Vpm' and Vpt' converted by the transformer voltage conversion unit 610, and the transformer single-phase-side voltages Vm and Vt. The waveforms shown in FIGS. 15A, 15B, and 15C are indicated by perunit when the peak value is 1. The transformer voltage conversion unit 610 converts the phase voltages Vu, Vv, and Vw measured by the transformer voltage measurement unit 603B into the transformer single-phase-side voltages Vpm' and Vpt'. The transformer single-phase-side voltages Vpm' and Vpt' converted by the transformer voltage conversion unit 610 are obtained by:

$$K = n_1/n_2 (n_1/n_2 : \text{turn ratio}, k=1)$$

$$V'_{pm} = V_{vw}/k = (V_v - V_w)/k$$

$$V_u = K \times V'_{pt}/3$$

$$V'_{pt} = V_u \times \sqrt{3}/k$$

$$\therefore V'_{pm} = V_v - V_w$$

$$V'_{pt} = V_u \times \sqrt{3} = 1.732 \times V_u \quad (2)$$

Vu: a three-phase-side U-phase voltage

Vv: a three-phase-side V-phase voltage

Vw: a three-phase-side W-phase voltage

Vpm': a single-phase-side voltage of the main transformer converted from the three-phase-side phase voltages Vpt': a single-phase-side voltage of the teaser transformer converted from the three-phase-side phase voltages The single-phase-side voltages Vpm' and Vpt' converted by the transformer voltage conversion unit 610 are supplied to the residual magnetic flux calculation unit 604B.

As shown in FIGS. 14A, 14B, 14C, 15A, 15B, and 15C, in the transformer voltage conversion unit 610, the waveforms of the single-phase-side voltages Vlm' and Vlt' converted from the three-phase-side line voltages Vuv, Vvw, and Vwu and the waveforms of the single-phase-side voltages Vpm' and Vpt' converted from the three-phase-side phase voltages Vu, Vv, and Vw have the same period and phase as those of the voltage waveforms of the transformer single-phase-side voltages Vm and Vt. Accordingly, the single-phase-side voltages Vlm', Vlt', Vpm', and Vpt' converted by the transformer voltage conversion unit 610 can be used by regarding them as voltages for calculating the transformer single-phase-side residual magnetic fluxes φZm and φZt.

The residual magnetic flux calculation unit 604B integrates the single-phase-side voltages Vlm', Vlt', Vpm', and Vpt' converted by the transformer voltage conversion unit 610 immediately after the circuit breaker 2 shuts down the transformer 3, thereby calculating the transformer single-phase-side residual magnetic fluxes φZm and φZt. The rest of the arrangement is the same as that of the residual magnetic flux calculation unit 604 according to the second embodiment.

As described above, in the excitation inrush current suppressing apparatus 6B of the third embodiment, the three-phase-side line voltages Vuv, Vvw, and Vwu and phase voltages Vu, Vv, and Vw of the modified-Woodbridge-connected transformer 3 are respectively converted into the single-phase-side voltages Vlm' and Vlt', and Vpm' and Vpt', although the transformer single-phase-side voltage detectors 5M and 5T do not exist between the circuit breaker 2 and transformer single-phase-side terminal. Therefore, the excitation inrush current suppressing apparatus 6B can calculate the residual magnetic fluxes φZm and φZt, and can suppress the excitation inrush currents Im and It in the same manner as in the second embodiment.

Note that when closing the circuit breaker 2, the power-on time of the transformer 3 varies due to, e.g., a preceding discharge called pre-arc which occurs between the main contacts or an operation variation of the operating mechanism. If this power-on variation caused by pre-arc or the variation when closing the circuit breaker 2 poses a problem, it is only necessary to acquire the variation characteristic beforehand, and correct the variation when controlling the close phase of the circuit breaker 2. Accordingly, these variations do not disturb the suppression of the excitation inrush currents Im and It.

Note also that in the excitation inrush current suppressing apparatus 6B at the time of power-on of the transformer 3, when closing the circuit breaker 2 on the single-phase AC side by a phase at which the steady magnetic flux φTm and residual magnetic flux φZm on the single-phase side of a main transformer 302 and the steady magnetic flux φTt and residual magnetic flux φZt on the single-phase side of a teaser transformer 301 almost match, it is also possible to individually close the circuit breaker 2.

(Fourth Embodiment)

FIG. 16 is a block diagram showing the configuration of a power system including an excitation inrush current suppressing apparatus 6C according to the fourth embodiment. The excitation inrush current suppressing apparatus 6C shown in FIG. 16 includes a phase detection unit (a phase detector) 605C instead of the phase detection unit 605 of the first embodiment. Also, the excitation inrush current suppressing apparatus 6C additionally includes an open command output unit (an open command output device) 609. The rest of the arrangement is the same as that of the excitation inrush current suppressing apparatus 6 according to the first embodiment.

In the excitation inrush current suppressing apparatus 6C, the phase detection unit 605C detects timings at which the phases of phase voltages Va and Vb of a bus 1 measured by a bus voltage measurement unit 601 and single-phase-side voltages Vm and Vt of a modified-Woodbridge-connected transformer 3 measured by a transformer voltage measurement unit 603 change to a previously held phase. When detecting the held phase, the phase detection unit 605C notifies a close command output unit 606 and the open command output unit 609 of the detection timing of the held phase. The close command output unit 606 and open command output unit 609 issue commands so as to perform closing and opening at the detection timing of the held phase with respect to an operating mechanism for driving the main contact of a circuit breaker 2. Consequently, the close command output unit 606 and open command output unit 609 always close and open the circuit breaker 2 by the same phase. Note that a predetermined phase is held in the phase detection unit 605C, but may also be preset or held in accordance with conditions under which the circuit breaker 2 is opened and closed in the past.

As described above, in the excitation inrush current suppressing apparatus 6C of the fourth embodiment, the cutoff phase and close phase of the modified-Woodbridge-connected transformer 3 are always preset phases. Accordingly, the excitation inrush current suppressing apparatus 6C can suppress the excitation inrush currents Im and It as in the first embodiment.

Note that when closing the circuit breaker 2, the power-on time of the transformer 3 varies due to, e.g., a preceding discharge called pre-arc which occurs between the main contacts or an operation variation of the operating mechanism. A controller which performs phase control can correct this power-on variation caused by pre-arc or the variation when closing the circuit breaker 2 by acquiring the characteristics of these variations beforehand. Accordingly, these variations do not disturb the suppression of the excitation inrush currents Im and It.

(Fifth Embodiment)

FIG. 17 is a block diagram showing the configuration of a power system including an excitation inrush current suppressing apparatus 6D according to the fifth embodiment. The excitation inrush current suppressing apparatus 6D shown in FIG. 17 includes a phase detection unit (a phase detector) 605D, instead of the phase detection unit 605A in the excitation inrush current suppressing apparatus 6A according to the second embodiment. Also, the excitation inrush current suppressing apparatus 6D additionally includes a measurement information holding unit (a measurement information storage) 607, open phase control unit (open phase controller) 608, and open command output unit (open command output device) 609. The rest of the arrangement is the same as that of the excitation inrush current suppressing apparatus 6A according to the second embodiment.

In the excitation inrush current suppressing apparatus 6D, the measurement information holding unit 607 holds residual magnetic fluxes $\phi Zm$ and $\phi Zt$ calculated by a residual magnetic flux calculation unit 604 before the excitation inrush current suppressing apparatus 6D operates. The measurement information holding unit 607 also holds, as measurement information, the relationship between a cutoff phase and the residual magnetic fluxes $\phi Zm$ and $\phi Zt$ on the single-phase side when a modified-Woodbridge-connected transformer 3 is shut down. In this case, the measurement information holding unit 607 opens a circuit breaker 2 at least once before the operation.

That is, the open phase control unit 608 receives the residual magnetic fluxes $\phi Zm$ and $\phi Zt$ held in the measurement information holding unit 607 and phase voltages Va and Vb of a bus 1 measured by a bus voltage measurement unit 601, and, based on the residual magnetic fluxes $\phi Zm$ and $\phi Zt$ and phase voltages Va and Vb, controls the open phase of the main contact of the circuit breaker 2 so that the open phase is always the same. The open phase control unit 608 supplies the controlled open phase to the open command output unit 609. The open command output unit 609 opens the circuit breaker 2 based on the open phase supplied from the open phase control unit 608.

The phase detection unit 605D receives the residual magnetic fluxes $\phi Zm$ and $\phi Zt$ held in the measurement information holding unit 607 and steady magnetic fluxes $\phi Tm$ and $\phi Tt$ calculated by a steady magnetic flux calculation unit 602, and identifies a close phase range Tc based on the steady magnetic fluxes $\phi Tm$ and $\phi Tt$ and residual magnetic fluxes $\phi Zm$ and $\phi Zt$.

After the circuit breaker 2 and modified-Woodbridge-connected transformer 3 are once connected to the power system, the circuit conditions of the power system are always the same. If the phase at which the circuit breaker 2 is opened is always the same, therefore, the value of the residual magnetic flux of each phase of the modified-Woodbridge-connected transformer 3 is also always the same.

Accordingly, in the excitation inrush current suppressing apparatus 6D of the fifth embodiment, when the circuit breaker 2 shuts down the modified-Woodbridge-connected transformer 3, the open phase of the circuit breaker 2 is so controlled that the cutoff phase is always the same. That is, in the excitation inrush current suppressing apparatus 6D, the residual magnetic fluxes $\phi Zm$ and $\phi Zt$ can always be the same, so they can always be the same when exciting the modified-Woodbridge-connected transformer 3 by closing the circuit breaker 2. Consequently, the excitation inrush current suppressing apparatus 6D can always suppress excitation inrush currents Im and It.

Also, when transformer single-phase-side voltage detectors 5M and 5T are not always connected, the excitation inrush current suppressing apparatus 6D can obtain the residual magnetic fluxes $\phi Zm$ and $\phi Zt$ held in the measurement information holding unit 607. Therefore, the transformer single-phase-side voltage detectors 5M and 5T can be connected only when the measurement information holding unit 607 performs measurement, and disconnected in a normal operation state. In addition, a broken-line portion shown in FIG. 17 can be detached. However, it is also possible to permanently install the transformer single-phase-side voltage detectors 5M and 5T.

Furthermore, in the excitation inrush current suppressing apparatus 6D at the time of power-on of the transformer 3, when closing the circuit breaker 2 on the single-phase AC side by a phase at which the steady magnetic flux $\phi Tm$ and residual magnetic flux $\phi Zm$ on the single-phase side of a main transformer 302 and the steady magnetic flux $\phi Tt$ and residual magnetic flux $\phi Zt$ on the single-phase side of a teaser transformer 301 almost match, it is also possible to individually close the circuit breaker 2.

(Sixth Embodiment)

FIG. 18 is a block diagram showing the configuration of a power system including an excitation inrush current suppressing apparatus 6E according to the sixth embodiment. The excitation inrush current suppressing apparatus 6E shown in FIG. 18 includes the phase detection unit (the phase detector) 605D according to the fifth embodiment, instead of the phase detection unit 605A of the third embodiment. Also, the excitation inrush current suppressing apparatus 6E additionally includes the open phase control unit (the open phase controller) 608 and open command output unit (open command output device) 609 according to the fifth embodiment, and a measurement information holding unit (a measurement information storage) 607E. The rest of the arrangement is the same as that of the excitation inrush current suppressing apparatus 6B according to the third embodiment.

In the excitation inrush current suppressing apparatus 6E, the measurement information holding unit 607E holds residual magnetic fluxes $\phi Zm$ and $\phi Zt$ calculated by a residual magnetic flux calculation unit 604 before an operation. The measurement information holding unit 607E also holds, as measurement information, the relationship between a cutoff phase and the residual magnetic fluxes $\phi Zm$ and $\phi Zt$ on the single-phase side when shutting down a modified-Woodbridge-connected transformer 3. In this case, the measurement information holding unit 607E opens a circuit breaker 2 at least once before an operation.

As in the fifth embodiment, the open phase control unit 608 controls the open phase of the main contact of the circuit breaker 2 such that the cutoff phase is always the same, based on the residual magnetic fluxes φZm and φZt held in the measurement information holding unit 607E and phase voltages Va and Vb of a bus 1 measured by a bus voltage measurement unit 601. This open phase controlled by the open phase control unit 608 is supplied to the open command output unit 609. As in the fifth embodiment, the open command output unit 609 opens the circuit breaker 2 based on the open phase received from the open phase control unit 608.

On the other hand, as in the fifth embodiment, the phase detection unit 605D identifies a close phase range Tc within which the transformer 3 is powered on, based on the residual magnetic fluxes φZm and φZt held in the measurement information holding unit 607E and steady magnetic fluxes φTm and φTt calculated by a steady magnetic flux calculation unit 602. The process of suppressing excitation inrush currents after that is the same as that of the third embodiment.

As described above, in the excitation inrush current suppressing apparatus 6E of the sixth embodiment, after the circuit breaker 2 and excitation inrush current 3 are once connected to the power system, the circuit conditions of the power system are always the same. If the phase at which the circuit breaker 2 is opened is always the same, therefore, the values of the residual magnetic fluxes φZm and φZt of each phase of the modified-Woodbridge-connected transformer 3 are also always the same.

In this embodiment, the residual magnetic fluxes φZm and φZt are always the same because they are held in the measurement information holding unit 607E. That is, when shutting down the modified-Woodbridge-connected transformer 3 by the circuit breaker 2, the excitation inrush current suppressing apparatus 6E can shut down the transformer 3 by controlling the open phase of the circuit breaker 2 such that the cutoff phase is always the same. The excitation inrush current suppressing apparatus 6E can also excite the modified-Woodbridge-connected transformer 3 by closing the circuit breaker 2 by the same phase at all times. Accordingly, the excitation inrush current suppressing apparatus 6E can always suppress excitation inrush currents Im and It.

Also, when transformer three-phase-side voltage detectors 5U, 5V, and 5W are not always connected, the excitation inrush current suppressing apparatus 6E can obtain the residual magnetic fluxes φZm and φZt held in the measurement information holding unit 607E. Therefore, transformer single-phase-side voltage detectors 5M and 5T can be connected only when the measurement information holding unit 607E performs measurement, and disconnected in a normal operation state. In addition, a portion indicated by the one-dot dashed lines in FIG. 18 can be detached. However, it is also possible to permanently install the transformer three-phase-side voltage detectors 5U, 5V, and 5W.

Furthermore, in the excitation inrush current suppressing apparatus 6E at the time of power-on of the transformer 3, when closing the circuit breaker 2 on the single-phase AC side by a phase at which the steady magnetic flux φTm and residual magnetic flux φZm on the single-phase side of a main transformer 302 and the steady magnetic flux φTt and residual magnetic flux φZt on the single-phase side of a teaser transformer 301 almost match, it is also possible to individually close the circuit breaker 2.

As is apparent from the above explanation, the excitation inrush current suppressing apparatuses according to the first to sixth embodiments can suppress the excitation inrush currents Im and It generated when connecting the transformer 3 which converts a three-phase AC voltage into a single-phase AC voltage to the power system on the single-phase AC side by using the circuit breaker 2 from the single-phase side.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An excitation inrush current suppressing apparatus which is used in a power system for selectively connecting and disconnecting a transformer includes a main transformer and a teaser transformer and which converts a three-phase AC voltage into a single-phase AC voltage to and from a single-phase AC-side bus by closing and opening a contact of a single-phase AC-side circuit breaker, and which suppresses an excitation inrush current generated when connecting the transformer, comprising:
   a bus voltage measurement unit which measures each phase voltage of the single-phase AC-side bus;
   a steady magnetic flux calculation unit which calculates a steady magnetic flux of the transformer from each phase voltage measured by the bus voltage measurement unit;
   a transformer voltage measurement unit which measures three-phase-side line voltages of the transformer;
   a transformer voltage conversion unit which converts the three-phase-side line voltages measured by the transformer voltage measurement unit into a transformer single-phase-side voltage;
   a residual magnetic flux calculation unit which calculates a residual magnetic flux from the transformer single-phase-side voltage converted by the transformer voltage conversion unit;
   a phase detection unit which identifies a range in which a polarity of the steady magnetic flux calculated by the steady magnetic flux calculation unit matches a polarity of the residual magnetic flux calculated by the residual magnetic flux calculation unit, and phases thereof overlap each other; and
   a close command output unit which closes the circuit breaker within the phase range identified by the phase detection unit, wherein
   the transformer voltage conversion unit obtains, as a single-phase-side voltage of the main transformer, a calculation result obtained by multiplying one of the three-phase-side line voltages measured by the transformer voltage measurement unit by a constant of 1.732, and obtains a difference between remaining ones of the measured three-phase-side line voltages as a single-phase-side voltage of the teaser transformer, and
   the residual magnetic flux calculation unit integrates the single-phase-side voltages obtained by the main transformer and the teaser transformer immediately after the transformer is disconnected by the circuit breaker, thereby obtaining residual magnetic fluxes of the main transformer and the teaser transformer on the transformer single-phase side.

2. The excitation inrush current suppressing apparatus according to claim 1, wherein the transformer is one of a Woodbridge-connected transformer, a modified Woodbridge transformer, and a roof-delta-connected transformer.

3. The excitation inrush current suppressing apparatus according to claim 1, wherein the circuit breaker is individually closed by a phase at which the steady magnetic flux and the residual magnetic flux on the single-phase side of the transformer substantially match.

4. An excitation inrush current suppressing apparatus which is used in a power system for selectively connecting and disconnecting a transformer includes a main transformer and a teaser transformer and which converts a three-phase AC voltage into a single-phase AC voltage to and from a single-phase AC-side bus by closing and opening a contact of a single-phase AC-side circuit breaker, and which suppresses an excitation inrush current generated when connecting the transformer, comprising:
  a bus voltage measurement unit which measures each phase voltage of the single-phase AC-side bus;
  a steady magnetic flux calculation unit which calculates a steady magnetic flux of the transformer from each phase voltage measured by the bus voltage measurement unit;
  a transformer voltage measurement unit which measures a three-phase-side phase voltage of the transformer;
  a transformer voltage conversion unit which converts the three-phase-side phase voltage measured by the transformer voltage measurement unit into a transformer single-phase-side voltage;
  a residual magnetic flux calculation unit which calculates a residual magnetic flux from the transformer single-phase-side voltage converted by the transformer voltage conversion unit;
  a measurement information holding unit which stores, before an operation, the residual magnetic flux calculated by the residual magnetic flux calculation unit when the circuit breaker is opened at least once, and a relationship between the residual magnetic flux and a cutoff phase when the circuit breaker is opened;
  an open phase control unit which receives the residual magnetic flux stored in the measurement information holding unit and each phase voltage of the bus from the bus voltage measurement unit, and, based on the received residual magnetic flux and each received phase voltage of the bus, controls an open phase of the circuit breaker such that the cutoff phase remains the same;
  an open command output unit which opens the circuit breaker by the open phase controlled by the open phase control unit;
  a phase detection unit which identifies a range in which a polarity of the steady magnetic flux calculated by the steady magnetic flux calculation unit matches a polarity of the residual magnetic flux stored in the measurement information holding unit, and phases thereof overlap each other; and
  a close command output unit which closes the circuit breaker within the phase range identified by the phase detection unit, wherein
  the transformer voltage conversion unit obtains, as a single-phase-side voltage of the main transformer, a calculation result obtained by multiplying one of three-phase-side line voltages measured by the transformer voltage measurement unit by a constant of 1.732, and obtains a difference between remaining ones of the measured three-phase-side line voltages as a single-phase-side voltage of the teaser transformer, and
  the residual magnetic flux calculation unit integrates the single-phase-side voltages obtained by the main transformer and the teaser transformer immediately after the transformer is disconnected by the circuit breaker, thereby obtaining residual magnetic fluxes of the main transformer and the teaser transformer on the transformer single-phase side.

5. The excitation inrush current suppressing apparatus according to claim 4, wherein the transformer is one of a Woodbridge-connected transformer, a modified Woodbridge transformer, and a roof-delta-connected transformer.

6. The excitation inrush current suppressing apparatus according to claim 4, wherein the circuit breaker is individually closed by a phase at which the steady magnetic flux and the residual magnetic flux on the single-phase side of the transformer substantially match.

7. An excitation inrush current suppressing method for use in an excitation inrush current suppressing apparatus which suppresses an excitation inrush current generated when a transformer includes a main transformer and a teaser transformer and which converts a three-phase AC voltage into a single-phase AC voltage is connected to a single-phase AC-side power system by closing and opening a contact of a single-phase AC-side circuit breaker, comprising:
  measuring each phase voltage of the single-phase AC-side bus;
  calculating a steady magnetic flux of the transformer from each measured phase voltage;
  measuring a three-phase-side phase voltage of the transformer;
  obtaining, as a single-phase-side voltage of the main transformer, a calculation result obtained by multiplying one of the measured three-phase-side line voltages by a constant of 1.732, and obtaining a difference between remaining ones of the measured three-phase-side line voltages as a single-phase-side voltage of the teaser transformer;
  integrating the single-phase-side voltages obtained by the main transformer and the teaser transformer immediately after the transformer is disconnected by the circuit breaker, thereby obtaining residual magnetic fluxes of the main transformer and the teaser transformer on the transformer single-phase side;
  identifying a range in which a polarity of the calculated steady magnetic flux matches that of the calculated residual magnetic flux of the main transformer and the teaser transformer, and phases thereof overlap each other; and
  closing the circuit breaker within the identified phase range.

8. The excitation inrush current suppressing method according to claim 7, wherein the circuit breaker is individually closed by a phase at which the steady magnetic flux and the residual magnetic flux on the transformer single-phase side substantially match.

9. An excitation inrush current suppressing method for use in an excitation inrush current suppressing apparatus which suppresses an excitation inrush current generated when a transformer includes a main transformer and a teaser transformer and which converts a three-phase AC voltage into a single-phase AC voltage is connected to a single-phase AC-side power system by closing and opening a contact of a single-phase AC-side circuit breaker, comprising:

measuring each phase voltage of the single-phase AC-side bus;

calculating a steady magnetic flux of the transformer from each measured phase voltage;

measuring a three-phase-side phase voltage of the transformer;

obtaining, as a single-phase-side voltage of the main transformer, a calculation result obtained by multiplying one of the measured three-phase-side line voltages by a constant of 1.732, and obtaining a difference between remaining ones of the measured three-phase-side line voltages as a single-phase-side voltage of the teaser transformer;

integrating the single-phase-side voltages obtained by the main transformer and the teaser transformer immediately after the transformer is disconnected by the circuit breaker, thereby obtaining residual magnetic fluxes of the main transformer and the teaser transformer on the transformer single-phase side;

storing, before an operation, the residual magnetic flux of the main transformer and the teaser transformer calculated when the circuit breaker is opened at least once, and a relationship between the residual magnetic flux of the main transformer and the teaser transformer and a cutoff phase when the circuit breaker is opened;

receiving the stored residual magnetic flux of the main transformer and the teaser transformer and each phase voltage of the bus, and, based on the received residual magnetic flux of the main transformer and the teaser transformer and each received phase voltage of the bus, controlling an open phase of the circuit breaker such that the cutoff phase remains the same;

opening the circuit breaker by the controlled open phase;

identifying a range in which a polarity of the calculated steady magnetic flux matches that of the stored residual magnetic flux, and phases thereof overlap each other; and closing the circuit breaker within the identified phase range.

10. The excitation inrush current suppressing method according to claim 9, wherein the circuit breaker is individually closed by a phase at which the steady magnetic flux and the residual magnetic flux on the transformer single-phase side substantially match.

* * * * *